US007041780B2

(12) United States Patent
Buckley et al.

(10) Patent No.: US 7,041,780 B2
(45) Date of Patent: May 9, 2006

(54) METHODS OF PREPARING A POLYMERIC MATERIAL COMPOSITE

(75) Inventors: Paul W. Buckley, Scotia, NY (US); Jiawen Dong, Rexford, NY (US); Mark H. Giammattei, Selkirk, NY (US); Hua Guo, Selkirk, NY (US); Robert John Hossan, Delmar, NY (US); Christian Lietzau, Delmar, NY (US); Norberto Silvi, Clifton Park, NY (US)

(73) Assignee: General Electric, Pittfield, MA (US)

( * ) Notice: Subject to any disclaimer, the term of this patent is extended or adjusted under 35 U.S.C. 154(b) by 0 days.

(21) Appl. No.: 10/648,640

(22) Filed: Aug. 26, 2003

(65) Prior Publication Data

US 2005/0049362 A1    Mar. 3, 2005

(51) Int. Cl.
*C08F 6/06*    (2006.01)
(52) U.S. Cl. .................. 528/501; 525/132; 528/493; 528/499; 528/502 A; 523/348; 159/2.2
(58) Field of Classification Search ............... 528/493, 528/501, 502 A; 525/132
See application file for complete search history.

(56) References Cited

U.S. PATENT DOCUMENTS

| 3,306,874 | A | 2/1967 | Hay |
| 3,306,875 | A | 2/1967 | Hay |
| 3,365,422 | A | 1/1968 | Van Dort |
| 3,383,435 | A | 5/1968 | Cizek |
| 3,451,462 | A | 6/1969 | Szabo et al. |
| 3,457,343 | A | 7/1969 | Lohuizan et al. |
| 3,639,656 | A | 2/1972 | Bennett |
| 3,642,699 | A | 2/1972 | Copper et al. |
| 3,661,848 | A | 5/1972 | Cooper et al. |
| 3,733,299 | A | 5/1973 | Cooper et al. |
| 3,838,102 | A | 9/1974 | Bennett |
| 3,962,181 | A | 6/1976 | Sakauchi et al. |
| 3,973,890 | A | 8/1976 | Porter et al. |
| 4,054,553 | A | 10/1977 | Olander |
| 4,083,828 | A | 4/1978 | Olander |
| 4,092,294 | A | 5/1978 | Bennett, Jr. et al. |
| 4,373,065 | A | 2/1983 | Prest, Jr. |
| 4,421,470 | A | 12/1983 | Nakamura |
| 4,500,706 | A | 2/1985 | Mathis et al. |
| 4,719,594 | A | 1/1988 | Young et al. |
| 4,760,118 | A | 7/1988 | White et al. |
| 4,808,262 | A | 2/1989 | Aneja et al. |
| 4,845,142 | A | 7/1989 | Niwano et al. |
| 4,987,194 | A | 1/1991 | Maeda et al. |
| 4,992,222 | A | 2/1991 | Banevicius et al. |
| 4,994,217 | A | 2/1991 | Banevicius et al. |
| 5,017,655 | A | 5/1991 | Kase et al. |
| 5,053,288 | A | 10/1991 | Hashimoto et al. |
| 5,102,591 | A | 4/1992 | Hasson et al. |
| 5,130,356 | A | * | 7/1992 | Feuerherd et al. ............ 524/96 |
| 5,135,791 | A | 8/1992 | Imai et al. |
| 5,204,410 | A | 4/1993 | Banevicius et al. |
| 5,250,486 | A | 10/1993 | Shaffer |
| 5,283,021 | A | 2/1994 | Shih |
| 5,586,110 | A | 12/1996 | Nakaki |
| 5,607,700 | A | 3/1997 | Kando et al. |
| 5,804,111 | A | 9/1998 | Kobayashi et al. |
| 5,833,848 | A | 11/1998 | Tominari et al. |
| 6,100,366 | A | 8/2000 | Nakata et al. |
| 6,306,978 | B1 | 10/2001 | Braat et al. |
| 6,365,710 | B1 | 4/2002 | Wang et al. |
| 6,372,175 | B1 | 4/2002 | Inoue et al. |
| 6,407,200 | B1 | 6/2002 | Singh et al. |
| 6,437,084 | B1 | 8/2002 | Birsak et al. |
| 6,444,779 | B1 | 9/2002 | Singh et al. |
| 6,469,128 | B1 | 10/2002 | Guo et al. |
| 2001/0000520 | A1 | 4/2001 | Braat et al. |
| 2002/0055608 | A1 | 5/2002 | Braat et al. |
| 2002/0062054 | A1 | 5/2002 | Cistone et al. |
| 2002/0094455 | A1 | 7/2002 | Feist et al. |
| 2002/0151606 | A1 | 10/2002 | Bates et al. |
| 2002/0197438 | A1 | 12/2002 | Hay et al. |
| 2002/0197441 | A1 | 12/2002 | Hariharan et al. |
| 2003/0044564 | A1 | 3/2003 | Dris et al. |
| 2003/0067089 | A1 | 4/2003 | Wang et al. |

FOREIGN PATENT DOCUMENTS

| CA | 1063761 | 10/1979 |
| EP | 0 102 122 | 8/1983 |
| EP | 0 225 801 | 12/1986 |
| EP | 0 271 000 | 12/1987 |
| EP | 0 295 891 | 6/1988 |
| EP | 0 303 209 | 8/1988 |
| EP | 0 375 937 | 7/1990 |
| EP | 0 377 115 | 7/1990 |
| EP | 0 642 124 | 9/1994 |
| EP | 0 724 259 | 1/1996 |
| EP | 0 770 637 | 10/1996 |
| EP | 1 047 055 | 4/1999 |
| EP | 1 031 972 | 2/2000 |
| EP | 1 130 587 | 3/2001 |

(Continued)

OTHER PUBLICATIONS

JP 11268098. Publication Date. Oct. 5, 1999. Abstract Only.
JP58147332. Publication Date. Sep. 2, 1983. Abstract Only.
JP6093014. Publication Date Apr. 5, 1994. Abstract Only.
Paul F. Ranken "Flame Retardants" Plastics Additives Handbook, 5th Edition. Hanser Publishers, Munich. 2001. pp. 681-696.

(Continued)

*Primary Examiner*—Marc S. Zimmer

(57) ABSTRACT

Methods to prepare a poly(arylene ether) and poly(alkenyl aromatic) polymeric material having reduced levels of particulate impurities are described. The polymeric material prepared is suitable for use in data storage media applications.

101 Claims, 6 Drawing Sheets

FOREIGN PATENT DOCUMENTS

| | | |
|---|---|---|
| EP | 1 167 419 | 6/2001 |
| EP | 1 167 420 | 6/2001 |
| EP | 1 167 421 | 6/2001 |
| EP | 1 271 499 A2 | 1/2003 |
| GB | 1 213 467 | 11/1970 |
| JP | 63-13722 | 1/1988 |
| JP | 63-91231 | 4/1988 |
| JP | 63-91232 | 4/1988 |
| JP | 63256427 A * | 10/1988 |
| JP | 63-301247 | 12/1988 |
| JP | 63-309547 | 12/1988 |
| JP | 64-42601 | 2/1989 |
| JP | 1-92209 | 4/1989 |
| JP | 2-107651 | 4/1990 |
| JP | 2-208342 | 8/1990 |
| JP | 9-237437 | 9/1997 |
| WO | WO 01/11618 | 2/2001 |
| WO | WO 02/43943 | 6/2002 |
| WO | WO 03/052757 A1 | 6/2003 |

OTHER PUBLICATIONS

Schwarzenbach, et al. "Antioxidants". Plastics Additives Handbook, 5th Edition. Hanser Publishers, Munich. 2001. pp. 1-139.

R. Scherrer. "Colorants". Plastics Additives Handbook, 5th Edition. Hanser Publixhers, Munich. 2001. pp. 813-882. http://www.atofina.com/groupe/gb/actucomm/print.cfm?IdComm=5052.

International Search Report; International Application No. PCT/US2004/027237; International Filing Date Aug. 23, 2004; Applicant's Reference No. 126750; Date of Mailing Nov. 11, 2004; 6 pages.

International Search Report; International Application No. PCT/US2004/027605; International Filing Date Aug. 26, 2004; Applicant's Reference No. 135946; Date of Mailing Dec. 17, 2004; 7 pages.

International Search Report ; International Application No: PCT/US2004/027696; International Filing Date Aug. 25, 2004; Applicant's File Reference No: RD 120801; Date of Mailing Feb. 11, 2005; 7 pages.

* cited by examiner

METHODS OF PREPARING A POLYMERIC MATERIAL COMPOSITE

BACKGROUND OF INVENTION

Optical, magnetic and magneto-optic media are primary sources of high performance storage technology that enable high storage capacity coupled with a reasonable price per megabyte of storage. Areal density, typically expressed as billions of bits per square inch of disk surface area (gigabits per square inch ($Gbits/in^2$)), is equivalent to the linear density (bits of information per inch of track) multiplied by the track density in tracks per inch. Improved areal density has been one of the key factors in the price reduction per megabyte, and further increases in areal density continue to be demanded by the industry.

In the area of optical storage, advances focus on access time, system volume, and competitive costing. Increasing areal density is being addressed by focusing on the diffraction limits of optics (using near-field optics), investigating three dimensional storage, investigating potential holographic recording methods and other techniques.

Polymeric data storage media have been employed in areas such as compact disks (CD) and recordable or re-writable compact discs (e.g., CD-RW), and similar relatively low areal density devices, e.g. less than about 1 $Gbits/in^2$, which are typically read-through devices requiring the employment of a good optical quality substrate having low birefringence.

Unlike the CD, storage media having high areal density capabilities, typically up to or greater than about 5 $Gbits/in^2$, employ first surface or near field read/write techniques in order to increase the areal density. For such storage media, although the optical quality of the substrate is not relevant, the physical and mechanical properties of the substrate become increasingly important. For high areal density applications, including first surface applications, the surface quality of the storage media can affect the accuracy of the reading device, the ability to store data, and replication qualities of the substrate.

While there are materials presently available for use in data storage media, there remains a need for additional polymeric materials possessing the combined attributes necessary to satisfy the increasingly exacting requirements for data storage media applications.

SUMMARY OF INVENTION

In one embodiment a method of preparing a polymeric material comprises reacting a monohydroxy aromatic compound in the presence of a catalyst, oxygen, and a solvent to form a poly(arylene ether); combining the poly(arylene ether) with a poly(alkenyl aromatic) to form a mixture; obtaining a polymeric material from the mixture, wherein the polymeric material comprises poly(arylene ether) and poly(alkenyl aromatic); and purifying the monohydroxy aromatic compound, the solvent, the reaction mixture, the poly(arylene ether), the poly(alkenyl aromatic), the mixture, the polymeric material, or a combination of the foregoing to result in the polymeric material substantially free of visible particulate impurities.

In another embodiment, a method of preparing a polymeric material comprises combining poly(arylene ether) and poly(alkenyl aromatic) to form a mixture; obtaining a polymeric material from the mixture wherein the polymeric material comprises poly(arylene ether) and poly(alkenyl aromatic); purifying the poly(arylene ether), the poly(alkenyl aromatic), the mixture, the polymeric material, or a combination of the foregoing; and packaging, storing, or packaging and storing the polymeric material, wherein the polymeric material is substantially free of visible particulate impurities.

Other embodiments, including articles made from the polymeric material, are described below.

DETAILED DESCRIPTION

Figure 1:
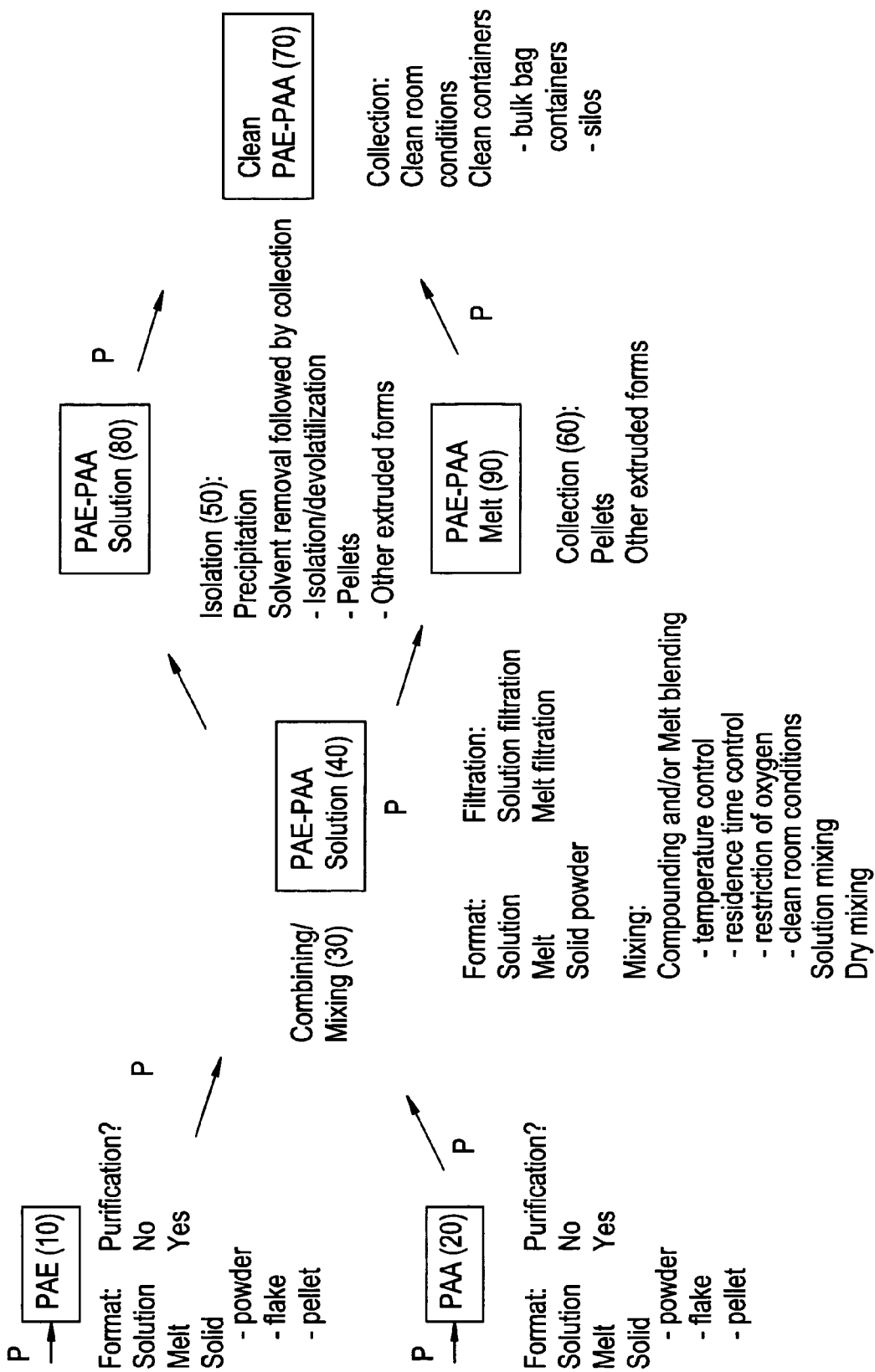
FIG. 1 illustrates a general scheme to prepare clean polymeric material comprising poly(arylene ether) and poly(alkenyl aromatic)

Due to the surface quality requirements of high areal density storage media, it is desirable that current data storage media are prepared from materials containing limited quantities of particulate impurities, whether inorganic or organic. Visible particulate impurities, such as gels and carbonized polymeric material (black specks), are undesirable as an aesthetic defect resulting in a consumer's perception of an inferior quality product. Particles having sizes larger than about 50 micrometers may act as stress concentrators in molded articles, thereby reducing the impact strength of these articles. Particulate impurities about 1 micrometer in size may contribute to an increase in haze which can affect the transmittance of light through or transparency of articles molded from material containing such impurities. Most importantly, particulate impurities may affect surface quality of storage media thereby affecting read accuracy, data storage, and replication.

Visible particulates or black specks and microscopic particulates are often present in poly(arylene ether) compositions as the poly(arylene ether) is subject to oxidative degradation at high temperatures. Poly(arylene ether)s tend to form carbonized black specks when processed at high shear rates and/or high temperatures. The amine compounds of catalyst systems employed in the preparation of poly(arylene ether)s may also contribute to the formation of black specks. Furthermore, when copper is used as a catalyst in the process to produce the poly(arylene ether), it is suspected that the copper contributes to the corrosion of stainless steel present in processing equipment. The corrosion results in the formation of black specks. It is theorized that iron from the stainless steel equipment is oxidized by the copper according to the formula: $Cu^{+2}+Fe \rightarrow Fe^{+2}+Cu$. Therefore, upon isolation of a poly(arylene ether) product from the reaction mixture used to prepare the poly(arylene ether), it is preferable to remove substantially all of the catalyst and corresponding amine portion.

Furthermore, colorless organic impurities such as gels may also be formed when producing or processing poly(arylene ether)s. Gels include high molecular weight polymers or crosslinked material caused by a number of factors, for example processing the poly(arylene ether) at high heat, degradation of additives present in the poly(arylene ether) that have poor thermal stability, remaining catalyst residue after poly(arylene ether) production, and other organic or inorganic contamination present in the poly(arylene ether). Finally, it is also suspected that the methyl groups of methyl substituted poly(arylene ether)s may oxidize in the reaction solution to a carboxylic acid. The carboxylic acid in turn may couple with the catalyst used in the preparation of the poly(arylene ether) or catalyst decomposition products to form a crosslinked polyamide structure manifesting itself as a black speck or a gel.

Poly(arylene ether)s exhibit physical and mechanical properties desirable for a number of applications. By combining poly(arylene ether) and another polymer, it is possible to obtain a material possessing qualities of each polymer. A preferred combination is a composite of poly (arylene ether) and poly(alkenyl aromatic). Any known method of blending or combining poly(arylene ether) and another polymer may be used to form a composite material. As the poly(arylene ether) is combined with other polymeric material, black specks, gels, and other impurities may be formed or collected during the process to form the composite. Accordingly, the composite may be processed to remove particulate impurities present in the starting components or impurities that form during the combining process. Alternatively, if the composite is prepared from clean starting components, care can then be taken not to introduce impurities into clean composite through processing or handling. Finally, conditions of isolating, collecting, and storing clean composite polymeric materials are preferably controlled to minimize the contamination of the composite from impurities from the surroundings.

As used herein, the term an environment substantially free of particulate impurities is defined as an environment the meets or exceeds ISO 14644-1 class rating of 10,000. A clean room rating of 10,000 is equivalent to the maximum number of particles (10,000) having a size greater than or equal to 0.5 micrometer per cubic foot.

As used herein, the term substantially free of visible particulate impurities means that a ten gram sample of a polymeric material dissolved in fifty milliliters of chloroform ($CHCl_3$) exhibits fewer than 5 visible specks when viewed in a light box. Particles visible to the naked eye are typically those greater than 40 micrometers in diameter.

As used herein, the term substantially free of particulate impurities greater than about 15 micrometers means that of a forty gram sample of polymeric material dissolved in 400 milliliters of $CHCl_3$, the number of particulates per gram having a size of about 15 micrometers is less than 50, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

In the preparation of a polymeric material substantially free of particulate impurities, a number of points along the process chain to prepare the polymeric material may be controlled, from the purity of the starting materials to the type of packaging used to contain the final, clean polymeric material to prevent further contamination. A wide range of techniques may be used to prepare clean polymeric material such as filtration methods, temperature control, use of inert atmospheres, use of clean rooms, special packaging and storage methods, and the like may be used alone or in combination to provide a clean composite.

FIG. 1 illustrates a general schematic for the preparation of a clean polymeric material comprising poly(arylene ether) (PAE) and poly(alkenyl aromatic) (PAA). The individual components of poly(arylene ether) (10) and poly(alkenyl aromatic) (20) may be in any form, such as a powder, flake, pellet, in solution, as a melt, and the like. In an exemplary embodiment, the poly(arylene ether) is in solution and the poly(alkenyl aromatic) is in the form of a pellet added to the solution. In another exemplary embodiment, the poly (arylene ether) is in the form of a powder and the poly (alkenyl aromatic) is in the form of a pellet. Any combinations of forms are contemplated herein. In addition to the component form, the components, independently, may or may not have been purified prior to their being combined. Various purification methods will be described in more detail herein.

Combining (30) the two components may be effected by any methods known in the art to result in an intimate mixture of two polymeric components. Suitable methods include melt compounding, solution blending, powder mixing, and the like to result in a mixture of the components (40) in a variety of formats. Such formats of the mixture may include melts (90), solutions (80), and solid powder mixtures. The mixture may optionally be purified by filtration of the melt or solution. The polymeric material comprising poly(arylene ether) and poly(alkenyl aromatic) may be isolated and/or collected without further purification of the mixture.

The polymeric material (70) may be isolated (50) from the mixture and/or collected (60) using various techniques depending upon the format of the mixture. In an exemplary embodiment, the polymeric material may be isolated by precipitation from a solution of the mixture and collected. Alternatively, if the mixture is in the form of a melt, the melt may be extruded and collected as pellets comprising the polymeric material. The isolated or collected form of the polymeric material (70) may include any form such as pellets, powders, flakes, and the like. A further purification step may be accomplished prior to or during the isolation or collection step. For example, a melt comprising a poly (arylene ether) and poly(alkenyl aromatic) may be melt filtered as it is extruded from an extruder.

At any number of points along the general schematic in FIG. 1, the components and/or the mixture may be purified to provide a final clean composite polymeric material. The "P" in FIG. 1 indicates locations where a purification step may occur in the process to produce a clean composite. For instance, the poly(arylene ether) and/or poly(alkenyl aromatic) may be purified prior to being combined to form a mixture. A solution mixture of poly(arylene ether) and poly(alkenyl aromatic) itself may be purified, for example by filtration, before isolation or collection of the clean polymeric material. Also contemplated are any combinations of purification steps, including multiple purification steps, that will result in a composite polymeric material substantially free of particulate impurities. All possible permutations of preparing a clean composite polymeric material are contemplated herein, including any type and number of purification steps, any form of starting components, any method of mixing, any format of mixtures, any method of isolation or collection, any form of composite, and the like.

In a process to prepare a clean polymeric material, any and all combinations of options within the general scheme of FIG. 1 are contemplated herein. For example, the poly (arylene ether) may be in the form of a solution that has been filtered. The poly(alkenyl aromatic) may be in the form of a pellet added to the solution of poly(arylene ether) to form a mixture. The solvent may be removed from the mixture through a devolatilization process to result in clean polymeric material that can be pelletized under clean room conditions and stored in clean containers, such as a clean Super Sack® available from B.A.G. Corporation. Another example may include the previous example having the poly(alkenyl aromatic) in the form of a solution and the mixture of poly(arylene ether) and poly(alkenyl aromatic) is filtered prior to isolation of the polymeric material. The details of a method to prepare a clean composite polymeric material will now be discussed.

In one embodiment, the starting components of poly (arylene ether) and poly(alkenyl aromatic) used to prepare the polymeric material are independently prepared and/or purified to be substantially free of particulate impurities prior to mixing or combining the components. In one embodiment, it is preferable that the poly(arylene ether) is the starting component to be purified as poly(arylene ether) is known to contain both inorganic and organic particulate impurities resulting from normal processing methods to prepare the poly(arylene ether). In another embodiment, the starting components of poly(arylene ether) and poly(alkenyl aromatic) are not purified independently prior to mixing, but are combined together followed by removal of particulate impurities from the mixture. In yet another embodiment, both purification of the starting components as well as the mixture is performed to result in a composite polymeric material substantially free of particulate impurities. Each embodiment and the many variations therein will be described in detail as follows.

The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

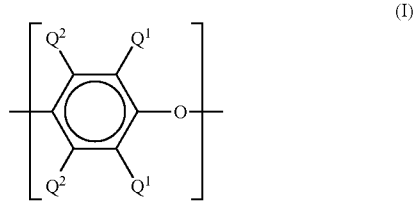

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. It will be understood that the term "haloalkyl" includes alkyl groups substituted with one or more halogen atoms, including partially and fully halogenated alkyl groups. Preferably, each $Q^1$ is alkyl or phenyl, especially $C_{1-4}$ alkyl, and each $Q^2$ is hydrogen or $C_{1-4}$ alkyl.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol.

Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above. Preferred poly(arylene ether)s are poly(2,6-dimethylphenylene ether) and poly(2,6-dimethylphenylene ether-co-2,3,6-trimethylphenylene ether) such as those described in U.S. Pat. No. 6,407,200 to Singh et al. and U.S. Pat. No. 6,437,084 to Birsak et al.

The poly(arylene ether) generally has a number average molecular weight of about 3,000–40,000 atomic mass units (amu) and a weight average molecular weight of about 20,000–80,000 amu, as determined by gel permeation chromatography. The poly(arylene ether) may have an intrinsic viscosity (IV) of about 0.10 to about 0.60 deciliters per gram (dl/g), as measured in chloroform at 25° C. Within this range an IV of less than or equal to about 0.48 preferred, and less than or equal to about 0.40 more preferred. Also preferred within this range is an IV of greater than or equal to about 0.29, with greater than or equal to about 0.33 dl/g more preferred. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly (arylene ether) used and the ultimate physical properties that are desired.

Suitable poly(arylene ether)s include, for example, poly (2,6-dimethyl-1,4-phenylene ether); poly(2,3,6-trimethyl-1, 4-phenylene) ether; poly(2,6-diethyl-1,4-phenylene)ether; poly(2-methyl-6-propyl-1,4-phenylene) ether; poly(2,6-dipropyl-1,4-phenylene) ether; poly(2-ethyl-6-propyl-1,4-phenylene)ether; poly(2,6-dilauryl-1,4-phenylene) ether; poly(2,6-diphenyl-1,4-phenylene) ether; poly(2,6-dimethoxy-1,4 phenylene) ether; poly(2,6-diethoxy-1,4-phenylene) ether; poly(2-methoxy-6-ethoxy- 1,4-phenylene) ether; poly(2-ethyl-6-stearyloxy-1,4-phenylene) ether; poly(2,6-dichloro-1,4-phenylene) ether; poly(2-methyl-6-phenyl-1,4-phenylene) ether; poly(2-ethoxy-1,4-phenylene) ether; poly(2-chloro-1,4-phenylene) ether; poly(2, 6-dibromo-1,4-phenylene) ether; poly(3-bromo-2,6-dimethyl-1,4-phenylene) ether; or a mixture of the foregoing poly(arylene ether)s.

Suitable base titratable functionalized poly(arylene ether) resins include, for example, those prepared via reaction with an appropriate acid or anhydride functionalization agent. For example those prepared by melt reaction of poly(arylene ether) with alpha,beta-unsaturated carbonyl compounds, including maleic anhydride, maleic acid, fumaric acid, citraconic anhydride, citraconic acid, itaconic anhydride, itaconic acid, aconitic anhydride, aconitic acid, and their esters and amines; alpha-hydroxy carbonyl compounds including carboxylic acids such as citric acid and maleic acid; derivatives of 5-hydroxybenzene-1,2,4-tricarboxylic anhydride, such as the 5-acetyl-derivative or a 4-ester-derivative such as the phenyl ester; trimellitic anhydride aryl esters, including trimellitic anhydride phenyl salicylate; and reaction products and combinations comprising at least one of the foregoing, among others, can be employed. Alternatively, poly(arylene ether) may be functionalized with acidic or latent acidic groups in a suitable solvent. Examples of such processes include metallation of poly(arylene ether) in tetrahydrofuran (THF) followed by quenching with carbon dioxide or capping of poly(arylene ether) in toluene solution with trimellitic anhydride acid chloride. Typically, less than or equal to about 10 weight percent (wt %) functionalization agent can be used (based on the weight of the poly(arylene ether) and the agent), with less than or equal to about 6 wt % preferred, and about 1.5 wt % to about 4 wt % especially preferred.

In one embodiment, the poly(arylene ether) comprises a capped poly(arylene ether). The capping may be used to prevent the oxidation of terminal hydroxy groups on the poly(arylene ether) chain. The terminal hydroxy groups may be inactivated by capping with an inactivating capping agent via an acylation reaction, for example. The capping agent chosen is desirably one that results in a less reactive poly (arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. The preferred capping agents are salicylic carbonate and the polysalicylates, especially linear polysalicylates. When capped, the poly(arylene ether) may be capped to any desirable extent up to 80 percent, more preferably up to about 90 percent, and even more preferably up to 100 percent of the hydroxy groups are capped. Suitable capped poly(arylene ether) and their preparation are described in U.S. Pat. No. 4,760,118 to White et al. and U.S. Pat. No. 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly (arylene ether). The aminoalkyl group, ortho to the terminal hydroxy group of the poly(arylene ether), is susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkylbenzamine (salicylamide). The removal of the amino group and the capping provides a poly(arylene ether) that is more stable to high temperatures, thereby resulting in fewer degradative products, such as gels or black specks, during processing of the poly(arylene ether).

Based upon the foregoing, it will be apparent to those skilled in the art that the contemplated poly(arylene ether) resin may include many of those poly(arylene ether) resins presently known, irrespective of variations in structural units or ancillary chemical features.

The particulate impurities may be removed from the poly(arylene ether) immediately after the polymer is prepared, but before it is isolated or the impurities may be removed post-preparation and isolation. Furthermore, the poly(arylene ether) may be prepared in such a way as to minimize the production of impurities.

The poly(arylene ether)s are typically prepared by the oxidative coupling of at least one monohydroxyaromatic compound in the presence of a catalyst system, oxygen, and solvent. There is no particular limitation on the monohydroxyaromatic compounds used in the poly(arylene ether) synthesis. Suitable monohydroxyaromatic compounds include those according to the following formula (II)

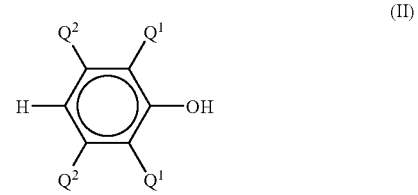

wherein each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen or $C_{1-4}$ alkyl. Preferred monohydroxyphenols include 2,6-dimethylphenol and 2,3,6-trimethylphenol.

In one embodiment, the monohydroxyphenol is 2,6-dimethylphenol having a purity of greater than about 99 weight percent, preferably greater than about 99.67 weight percent, and more preferably greater than about 99.83 weight percent. Additionally, the 2,6-dimethylphenol preferably has an APHA color of less than about 102 and more preferably less than about 79.

The oxidative coupling of the monohydric phenol uses an oxygen-containing gas, which is typically oxygen ($O_2$) or air, with oxygen being preferred.

Suitable organic solvents for the oxidative coupling include aliphatic alcohols, ketones, aliphatic and aromatic hydrocarbons, chlorohydrocarbons, nitrohydrocarbons, ethers, esters, amides, mixed ether-esters, sulfoxides, and the like, and combinations comprising at least one of the foregoing organic solvents, providing they do not interfere with or enter into the oxidation reaction. Preferred solvents include $C_6$–$C_{18}$ aromatic hydrocarbons such as benzene, toluene, and xylene; halogenated hydrocarbons such as dichloromethane, and chloroform; and halogenated aromatic hydrocarbons such as chlorobenzene and dichlorobenzene.

The solvent may comprise, in addition to a $C_6$–$C_{18}$ aromatic hydrocarbon, a $C_3$–$C_8$ aliphatic alcohol that is a poor solvent for the poly(arylene ether), such as, for example, n-propanol, isopropanol, n-butanol, t-butanol, n-pentanol, and the like, and combinations comprising at least one of the foregoing $C_3$–$C_8$ aliphatic alcohols. The solvent may further comprise, in addition to a $C_6$–$C_{18}$ aromatic hydrocarbon and a $C_3$–$C_8$ aliphatic alcohol, methanol or ethanol, which act as an anti-solvent for the poly (arylene ether). The $C_6$–$C_{18}$ aromatic hydrocarbon, the $C_3$–$C_8$ aliphatic alcohol, and the methanol or ethanol may be combined in any proportion, but it may be preferred that the solvent comprise at least about 50 weight percent of the $C_6$–$C_{18}$ aromatic hydrocarbon. In one embodiment, the use of poor solvents is used to precipitate a poly(arylene ether) of a particular molecular weight. The precipitated poly (arylene ether) may then be separated from the reaction solvent which contains the catalyst and dissolved impurities.

Catalyst systems for the preparation of the poly(arylene ether) typically contain at least one heavy metal compound such as a copper, manganese or cobalt compound, usually in combination with various other materials. Suitable catalyst systems include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate and cuprous benzoate; and similar manganese salts and cobalt salts. Instead of direct addition of the above-exemplified metal salt, it is also possible to add a metal or a metal oxide and an inorganic acid, organic acid or an aqueous solution of such an acid and form the corresponding metal salt or hydrate.

The catalyst systems may also be complexed with a mono- or dialkylamine, aromatic amines or N,N'-dialkylalkylenediamines. Non-limiting examples of suitable primary, secondary or tertiary amines include mono- and dimethylamine, mono- and diethylamine, mono- and dipropylamine, mono- and dibutylamine, mono- and dibenzylamine, mono- and dicyclohexylamine, mono- and diethanolamine, methylethylamine, methylpropylamine, methylcyclohexylamine, ethylisopropylamine, benzylmethylamine, octylchlorobenzylamine, methylphenethylamine, benzylethylamine, dimethylbutylamine, N,N'-dialkylethylenediamines such as N,N'-di-tert-butylethylenediamine, and N,N'-di-isopropylethylenediamine, N,N,N'-trialkylethylenediamines, N,N'-dialkylpropylenediamines and N,N,N'-trialkylpropylenediamines.

At the completion of the reaction process, the solvent and/or catalyst are preferably recovered and recycled for further use.

Known processes to prepare poly(phenylene ether)s include those described in European patent documents EP 1167421A2; EP1167419A2; and EP1167420A1. Further methods for preparing poly(phenylene ether)s are described, for example, in U.S. Pat. Nos. 6,407,200, 5,250,486; 5,017,655; 4,092,294; 4,083,828; 4,054,553; 3,962,181; 3,838,102; 3,733,299; 3,661,848; 3,642,699; 3,639,656; 3,365,422; 3,306,875; and 3,306,874. Based upon the foregoing, it will be apparent to those skilled in the art that the contemplated poly(arylene ether) may prepared by all methods presently known, irrespective of variations in processing conditions, reagents, or catalysts.

In another aspect, the starting materials used to prepare the poly(arylene ether) are purified prior to the oxidative coupling. Any known method for obtaining clean starting material may be used. For instance, the monohydroxyaromatic compound may be recrystallized or filtered as a solution prior to introduction into the reactor to remove impurities present in the compound. An in line filtration system to filter the feed stream of the monohydroxyaromatic compound is preferable, but also contemplated are batch filtrations of the starting material followed by storage in a clean tank or vessel. Purification of the hydroxyaromatic compound helps to remove chain-stoppers and allows for a lower catalyst usage thereby facilitating easier cleanup and removal of the catalyst from the poly(arylene ether).

Furthermore, the solvent used in the process to produce the poly(arylene ether) is preferably free of organic and/or inorganic particulate impurities.

The starting materials used to prepare the catalyst are preferably of high purity. Additionally, the catalyst stream may also be filtered prior to the reaction process.

There is no particular limitation on the apparatus used to carry out the poly(arylene ether) preparation. The reaction may be carried out both in the batch, semi-batch, or continuous modes. Programmed addition of portions of the monohydroxy aromatic compound at various points in the reaction may be employed. Various types of reactors may be used for the polymerization, including a single stirred tank reactor, two or more continuous stirred tank reactors in series, a bubble column reactor, or a column reactor. In one embodiment the reaction equipment, such as reaction vessels and storage tanks, used in the preparation of the poly(arylene ether) process are preferably dedicated equipment solely for the preparation of poly(arlyene ether). The use of dedicated equipment reduces the opportunity of contamination of the poly(arylene ether) with other resins. The reaction equipment may also be washed with extra clean solvent between reactions to remove impurities that may be present in the equipment. The shear rate of all process equipment used for mixing and transferring material are preferably in a range that would not generate additional gel/black specks.

In an exemplary process of forming poly(arylene ether), a solvent, a catalyst, and other optional reaction components such as a phase transfer agent, are charged to a clean reactor while feed streams of a monohydroxyaromatic compound and an oxygen source are fed to the reactor. When a targeted molecular weight is achieved, the addition of the oxygen source is ceased and a chelating agent may be added to the reaction solution to poison the catalyst and to aid in the recovery of the catalyst component. Additional water may be added to the mixture to improve the mixing and extraction efficiency of the chelated catalyst and other water-soluble components. The water used is preferably deionized or demineralized water or water that is substantially free of minerals and salts. Optionally, the extraction liquid may include an aqueous solution of a $C_1$–$C_4$ alkanol. The aqueous phase, containing chelated catalyst, is separated from the organic phase, containing poly(arylene ether), via a liquid/liquid separation means, such as a liquid/liquid centrifuge. In a preferred embodiment, the prepared poly(arylene ether) is subjected to a multi-stage cleanup for the efficient removal of catalyst. Suitable equipment for removal of the catalyst include mixer-settlers and extraction columns.

Suitable chelating agents include, for example, sulfuric acid, acetic acid, ammonium salts, bisulfate salts, and the like. Many different chelating agents may be used, but it is preferred to employ those chelating agents that are disclosed in U.S. Pat. No. 3,838,102 to Bennett et al. Useful chelating agents include polyfunctional carboxylic acid containing compounds, such as, for example, polyalkylenepolyamine polycarboxylic acids, aminopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts. Specific examples of chelating agents include, for example, sodium potassium tartrate, nitrilotriacetic acid (NTA), citric acid, glycine, ethylenediaminetetraacetic acid (EDTA), hydroxyethylenediaminetriacetic acid, diethylenetriamine-pentaacetic acid, salts of the foregoing chelating agents, combinations comprising at least one of the foregoing chelating agents, and the like. Especially preferred chelating agents include nitrilotriacetic acid, ethylenediaminetetraacetic acid or a mono-, di-, tri- and tetrasodium salt thereof.

After separation of the organic phase from the aqueous phase, the organic phase may optionally be washed again with water, an aqueous solution of $C_1$–$C_4$ alkanol, another suitable solvent that does not dissolve the polymer, or a combination of the foregoing wash solvents. Preferably the water is deionized or demineralized. The aqueous wash may optionally comprise a chelating agent to remove remaining catalyst that may be present in the organic phase. In one embodiment, it is preferable to remove substantially all of the catalyst from the organic phase as it is believed that catalyst residue may contribute to the formation of gels or black specks when the poly(arylene ether) is later isolated and/or processed.

In one embodiment, coalescers are used to help remove entrained water droplets from the organic phase. The water droplets from the aqueous phase may contain salts and other impurities.

In another aspect, the organic phase may optionally be filtered to remove organic and inorganic particulate impurities present therein prior to the isolation of the poly(arylene ether). As the foregoing filtration involves the removal of particulate impurities from a solution, the term solution filtration and solution filtration system will be used herein to describe such a process and equipment. Suitable solution filtration systems include filters made from a variety of materials such as, for example, sintered metal, cloth, polymeric fiber, natural fiber, paper, metal mesh, pulp, ceramic, or a combination of the foregoing materials, and the like. Particularly useful filters are sintered metal filters exhibiting high tortuosity, including the filters prepared by PALL Corporation.

The geometry of the filter itself may be cone, pleated, candle, stack, flat, wraparound, or a combination of the foregoing, and the like.

The pore size of the filter may be of any size in the range of 0.01 micrometer to 100 micrometers, or greater. Within this range, a pore size of less than or equal to about 50 micrometers can be employed, with less than or equal to about 20 micrometers preferred, and less than or equal to about 15 micrometers more preferred. Also preferred within this range is a pore size of greater than or equal to about 0.1 micrometer, with greater than or equal to about 3 micrometers more preferred, and greater than or equal to about 5 micrometers especially preferred.

Suitable solution filtration processes may include gravity filtration, pressure filtration, vacuum filtration, batch filtration, continuous filtration, or a combination of the foregoing filtration methods, and the like.

Any number of solution filtration systems or solution filtration steps may be used to filter the organic phase. A single filtration system may be used or two or more in series or in parallel. In one embodiment, the filters are reusable after treatment to remove collected impurities within or on the filter material itself. Suitable techniques to clean and reuse a filter medium are known in the art.

Prior to the filtration, the organic phase of poly(arylene ether) may optionally be concentrated to a higher percent solids level to reduce the volume of organic phase to be filtered or to facilitate downstream isolation processes. Any technique or apparatus to concentrate the organic phase may be used. Exemplary apparatuses include flash vessels, distillation systems, and the like. The solvent may be evaporated, preferably at an elevated temperature, for example in the range from about 100 to about 300° C., more preferably in the range of about 180 to about 260° C., and/or elevated pressure, for example in the range from about 2 to about 75 bar, more preferably in the range of about 5 to about 50 bar. Preferably the solvent may be removed by a vacuum flash at temperatures of about 50° C. to about 150° C. and a vacuum of about 100 to 500 millimeters of mercury. A single pass flash may be used or a recirculating flash. Care is preferably taken to prevent over-heating that may result in polymer decomposition.

Following solution filtration or no filtration of the organic phase, the poly(arylene ether) may be isolated in any number of ways, such as by precipitation and collection or by removal of the solvent. In one embodiment, the solvent may be removed through a devolatilization process, flash evaporation using flash vessels, use of a distillation system, continuous wipe film, spray drying, or a combination of the foregoing. Isolation may occur in one step or in any number of steps. For instance, prior to isolation, the organic phase may be concentrated to a higher percent solids level to aid in the isolation process. Again, any technique or apparatus to concentrate the organic phase may be used, such as flash vessels, distillation systems, and the like. When the organic phase is pre-concentrated, the temperature and processing conditions are preferably controlled to minimize the formation of gels and/or black specks.

When concentrated, the amount of poly(arylene ether) present in the concentrated organic phase (prefiltered or filtrate) may be about 10 to about 99 percent by weight based on the total weight of the polymer and organic solvent. Within this range, the amount of poly(arylene ether) present in the concentrated organic phase may be greater than or equal to about 20 weight percent, with greater than or equal to about 30 weight percent preferred, and greater than or equal to about 40 weight percent based on the total of polymer and organic solvent more preferred. Also within this range the amount of poly(arylene ether) present in the concentrated organic phase may be less than or equal to about 70, with less than or equal to about 60 preferred, and less than or equal to about 50 weight percent more preferred. After concentration, the concentrated organic phase may be filtered and optionally concentrated again prior to isolation of the poly(arylene ether). Alternatively, the poly(arylene ether) present in the concentrated organic phase may be isolated from the solvent by any of the methods described herein.

In one embodiment, the poly(arylene ether) is isolated from the organic phase by precipitation followed by collection of the precipitate. The organic phase may be contacted with an anti-solvent to precipitate the poly(arylene ether) and form a solid/liquid slurry. The precipitation may be conducted, for example, in a stirred tank vessel impeller with a desired shear rate. Alternative equipment include high shear mixing pumps, grinders, or high shear mixer chambers. Suitable high shear impellers are commercially available from, for example, Wilhelm Siefer GmbH & Co., Velbert, Germany. The shear rates during precipitation in the stirred tank and in the high shear homogenizer may be about 500 $sec^{-1}$ to 50,000 $sec^{-1}$.

In one embodiment, the polymer solution may be injected into an anti-solvent or poor solvent using an atomization nozzle. The poor solvent is preferably heated and contained in a highly agitated vessel or chamber where solvent can be flashed off, leaving the poly(arylene ether) in the form of a crumb slurried in the anti-solvent.

The slurry formed by any of the foregoing methods may then be collected using any conventional collection filtration or solid/liquid separation technique and apparatus. Suitable collection filtration apparatuses include rotating filters, continuous rotary vacuum filters, continuous moving bed filters, batch filters, and the like. Suitable solid/liquid separation apparatuses include continuous solid/liquid centrifuges.

In another embodiment, the collected, precipitated poly (arylene ether) may optionally be further washed one or more times before the poly(arylene ether) precipitate is dried. Washing may be performed, for example, with additional anti-solvent directly on the collection filter or by mixing the wetcake from the collection filter or solid/liquid separation apparatus with additional anti-solvent in a stirred vessel. The anti-solvent used to wash the precipitate may be any solvent that will not dissolve the poly(arylene ether). An exemplary method of washing the initial collected poly (arylene ether) precipitate uses a two-stage reslurry and solid/liquid separation process scheme. In this embodiment, the wetcake from the collection filter or solid/liquid separation apparatus is washed with anti-solvent in a stirred tank; the poly(arylene ether)/solvent/anti-solvent mixture may then be separated again with a collection filter or in a solid/liquid separation apparatus. The poly(arylene ether) wetcake from the second collection is then mixed again with anti-solvent in a continuous stirred tank, followed by a solid/liquid separation.

The collected poly(arylene ether) precipitate may be dried by known methods in the art to dry polymer powder. Suitable drying apparatuses to dry the precipitated poly (arylene ether) include rotary paddle dryers, conveyer dryers, fluid-bed dryers, quiescent bed dryers, and the like. The drying may be operated batch-wise or continuous. In a preferred embodiment, the drying is performed under an inert atmosphere, such as nitrogen, to minimize the oxidation of the poly(arylene ether). The precipitate may be dried at an elevated temperature and/or at reduced pressures to facilitate solvent evaporation. The temperature of the drying may be carefully controlled to prevent decomposition of the poly(arylene ether). Temperatures for drying the precipitate may be about 50° C. to about 400° C. The dryer equipment may be modified to prevent localized amounts of poly (arylene ether) from getting trapped in the dryer apparatus resulting in material decomposition. Such modifications include, surface finishing and equipment design. In one embodiment, the drying is performed under an inert atmosphere and preferably operated under negative pressure. The dryers are preferably cleaned prior to use to remove any residues. Also any transport systems, rotary locks, and blowers should be well maintained and designed to minimize polymer powder from intruding on bearing and seal surfaces where they might melt and degrade from frictional forces.

In one embodiment, the dried poly(arylene ether) powder is preferably substantially free of dust and other contaminants. Accordingly, the poly(arylene ether) may be precipitated, collected, dried, stored, and/or transported under conditions to prevent the contamination of the powder from particulate impurities from the surroundings, such as dust and other particulate contaminants. The use of clean rooms or a clean room-like environment may be used. The clean room environment preferably comprises substantially dust-free, filtered air. Suitable systems to remove dust and airborne-contaminants in the clean room atmosphere include systems comprising high efficiency particulate air (HEPA) filters, dust collectors, electrostatic air filters, and the like. In one embodiment, the environment where the precipitation/ isolation, packaging, and/or storage occur has a clean room class rating of about 100,000 or better. A clean room rating of 100,000 is equivalent to the maximum number of particles (100,000) having a size greater than or equal to 0.5 micrometer per cubic foot. A clean room rating of about 10,000 or better, may be used, with a clean room rating of about 1,000 or better preferred. The rooms or equipment where the poly(arylene ether) is isolated by precipitation, dried, and/or stored may be enclosed in a positive pressure system wherein the system's air is continuously filtered to remove airborne particulates.

Any container used to store and/or transport the poly (arylene ether) powder is preferably clean and substantially free of particulate impurities. In addition, the container preferably comprises a sealing means to prevent the introduction of impurities from the surroundings (e.g. through the use of seals, closing mechanisms, lids, screw tops, ties, etc.), during storage and/or transport. Suitable containers include any dust-tight, weather resistant container, for example, a silo, hopper car, dry bulk tanker or trailer, bulk sack containers such as a Super Sack®, sealable plastic bags, sealable jars, and the like.

In one embodiment, the poly(aryene ether) present in the organic phase obtained from the polymerization process is isolated using a devolatilization process. Devolatilizing extruders and processes are known in the art and typically involve a twin-screw extruder equipped with multiple venting sections for solvent removal. The devolatilizing extruders most often contain screws with numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including Welding Engineers, Inc.

In an exemplary devolatilization embodiment, a polymer-solvent mixture, such as the organic phase, may be fed into a vented extruder configured to have sufficient volume to permit efficient flash evaporation of solvent from the polymer-solvent mixture, even for very dilute solutions. Preferably the polymer-solvent mixture is heated prior to being feed into the extruder. Heating vessels are suitable for holding the polymer-solvent mixture prior to its introduction into the extruder. The heated polymer-solvent mixture may further be heated by means of a heat exchanger or exchangers. Pumps such as gear pumps may be used to transfer the polymer-solvent mixture through one or more heat exchangers.

The feed inlet through which the polymer-solvent mixture is fed to the feed zone of the extruder may be in close proximity to a nearby vent. The extruder vent upstream of the feed inlet, which is used to effect the bulk of the solvent removal, is herein described as an upstream vent. The upstream vent may be operated at atmospheric or subatmospheric pressure. The extruder, the feed inlet, and the upstream vent are configured to provide the volume needed to permit efficient flash evaporation of solvent from the polymer-solvent mixture. A vent located downstream of the feed port of the extruder is typically run at atmospheric pressure, but preferably at subatmospheric pressure and is described herein as a downstream vent.

The extruder may further comprise a side feeder equipped with a side feeder vent which provides for added volume and serves to trap and return polymer particles entrained by the escaping solvent vapors. The upstream vent nearby the feed inlet and the side feeder vent may be operated at atmospheric or subatmospheric pressure. The downstream vent completes the solvent removal process to provide a polymer product substantially free of solvent.

According to one embodiment, the polymer-solvent mixture is first heated under pressure to produce a superheated polymer-solvent mixture, wherein the temperature of the superheated mixture is greater than the boiling point of the solvent at atmospheric pressure. Typically, the temperature of the superheated polymer-solvent mixture will be about 2° C. to about 200° C. higher than the boiling point of the solvent at atmospheric pressure. Within this range, a temperature of less than or equal to about 150° C. can be employed, with less than or equal to about 100° C. preferred. Also preferred within this range is a temperature of greater than or equal to about 10° C., with greater than or equal to about 50° C. more preferred. In instances where there are multiple solvents present, the polymer-solvent mixture is superheated with respect to at least one of the solvent components. Where the polymer-solvent mixture contains significant amounts of both high and low boiling solvents, it is sometimes advantageous to superheat the polymer-solvent mixture with respect to all solvents present (i.e., above the boiling point at atmospheric pressure of the highest boiling solvent). Superheating of the polymer-solvent mixture may be achieved by heating the mixture under pressure.

Superheating may be described as the temperature a condensable gas is above its boiling point at its current pressure. The degree of superheat, $(P_1^v - P_t)$, to characterize superheating, may be defined as the difference between the equilibrium pressure of the solvent in the vapor phase $(P_1^v)$ and the total pressure in the space of the extruder where the devolatilization process takes place $(P_t)$ as a positive value. In another embodiment, the flash separation of the solvent from the polymer-solvent mixture may be accomplished by applying vacuum to the heated mixture so the surrounding pressure is lower than the vapor pressure of the solvent in the mixture. This method is also described herein as superheating as the degree of superheat $(P_1^v - P_t)$ is a positive value. A polymer-solvent mixture that is kept at a temperature below the boiling point of the solvent at atmospheric pressure can be in a superheated state as long as the surrounding pressure is lower than the vapor pressure of the solvent at the temperature of the mixture.

When the polymer-solvent mixture is pressurized, the system may comprise a pressure control valve downstream of the heat exchanger, if used, or downstream of the feed tank. The pressure control valve preferably has a cracking pressure higher than atmospheric pressure. The cracking pressure of the pressure control valve may be set electronically or manually and is typically maintained at from about 1 pounds per square inch (psi) (0.07 kgf/cm$^2$) to about 350 psi (25 kgf/cm$^2$) above atmospheric pressure. Within this range, a cracking pressure of less than or equal to about 100 psi (7.0 kgf/cm$^2$) can be employed, with less than or equal to about 50 psi (3.5 kgf/cm$^2$) above atmospheric pressure preferred. Also preferred within this range is a cracking pressure of greater than or equal to about 5 psi (0.35 kgf/cm$^2$), with greater than or equal to about 10 psi (0.7 kgf/cm$^2$) above atmospheric pressure more preferred. The back pressure generated by the pressure control valve is typically controlled by increasing or decreasing the cross sectional area of the valve opening. Typically, the degree to which the valve is open is expressed as percent (%) open, meaning the cross sectional area of valve opening actually being used relative to the cross sectional area of the valve when fully opened. The pressure control valve prevents evaporation of the solvent as it is heated above its boiling point. Typically, the pressure control valve is attached (plumbed) directly to an extruder and serves as the feed inlet of the extruder. A suitable pressure control valve includes a RESEARCH® Control Valve, manufactured by BadgerMeter, Inc.

Figure 6:
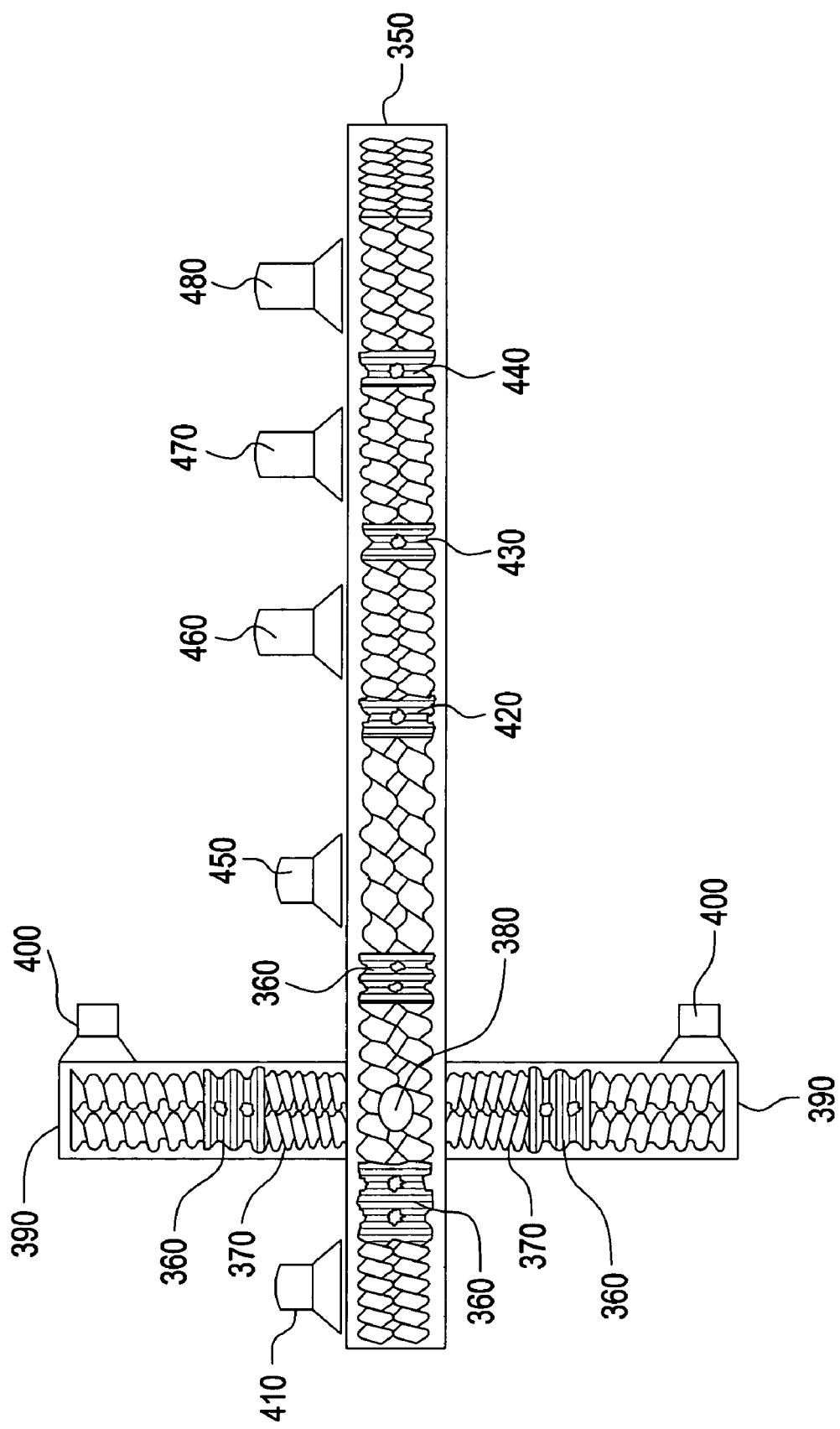
FIG. 6 illustrates an embodiment of a devolatilization extruder.

As mentioned previously, the devolatilization extruder may comprise a side feeder comprising a vent to aid in the removal of solvent from the polymer-solvent mixture. The extruder in combination with the side feeder is equipped with one or more vents in close proximity to the extruder feed inlet, such as a pressure control valve. The side feeder is typically positioned in close proximity to the feed inlet through which the polymer-solvent mixture is introduced into the extruder, preferably upstream from the feed inlet. For example, FIG. 6 illustrates an extruder (350) comprising two side feeders (390) having side feeder vents (400), kneading blocks (360) adapted for capturing solid polymer entrained by escaping solvent vapor, and side feeder conveying screw elements (370). Feed inlet (380) is shown in close proximity to the side feeders. The extruder in FIG. 6 also contains an upstream vent (410) and downstream vents (450), (460), (470), and (480). The extruder further includes kneading blocks (360) and screw elements (420), (430), and (440) to provide melt seals.

It has been found advantageous that the side feeder comprises a feeder vent operated at about atmospheric pressure or subatmospheric pressure. Alternatively, a side feeder feed inlet may be attached to the side feeder itself in which instance the side feeder feed inlet is attached to the side feeder at a position between the point of attachment of the side feeder to the extruder and the side feeder vent. In yet another alternative, the polymer-solvent mixture may be introduced through feed inlets which may be attached to the side feeder, the extruder, or to both extruder and side feeder.

Typically, the side feeder used according to the method is short, having a length to diameter ratio (L/D) of about 20 or less, preferably about 12 or less. The side feeder is typically not heated and functions to provide additional cross sectional area within the feed zone of the extruder thereby allowing higher throughput of the solvent-polymer mixture. The side feeder may be of the single-screw or the twin-screw type. Typically, the twin-screw type side feeder is preferred. The screw elements of the side feeder are configured to convey polymer (which is deposited in the side feeder as the solvent rapidly evaporates) back to the main channel of the extruder. Typically, the side feeder is equipped with at least one vent located near the end of the side feeder most distant from the point of attachment of the side feeder to the extruder. In instances in which a pressure control valve is attached to the side feeder it is preferably attached between the side feeder vent and the point of attachment of the side feeder to the extruder.

As mentioned, the side feeder screw elements are conveying elements which serve to transport deposited polymer into the extruder. In one embodiment the side feeder screw elements comprise a kneading element in addition to the conveying element. Side feeders comprising kneading screw elements are especially useful in instances in which the evaporating solvent has a tendency to entrain polymer particles in a direction opposite to that provided by the conveying action of the side feeder screw elements and out through the vent of the side feeder. The extruder can similarly comprise a kneading screw element between the point of introduction of the polymer-solvent mixture and the upstream vent. As in the side feeder, the kneading extruder screw elements act as mechanical filters to intercept polymer particles being entrained by the solvent vapor moving toward the vents.

The extruder used in the method and system may comprise any number of barrels, type of screw elements, etc. as long as it is configured to provide sufficient volume for flash evaporation of the solvent as well as the downstream devolatilization of remaining solvent. Exemplary extruders include a twin-screw counter-rotating extruder, a twin-screw co-rotating extruder, a single-screw extruder, or a single-screw reciprocating extruder. A preferred extruder is the co-rotating, intermeshing (i.e. self wiping) twin-screw extruder.

In one embodiment, the extruder preferably has a set barrel temperature greater than 190° C., preferably greater than or equal to about 200° C. In one embodiment the extruder comprises heated zones. In one embodiment, the heated zones of the extruder are operated at one or more temperatures of 190° C. to about 400° C. The expression wherein the extruder is operated at a temperature of 190° C. to about 400° C. refers to the heated zones of the extruder, it being understood that the extruder may comprise both heated and unheated zones. Within this embodiment, the temperature of the heated zones may be greater than or equal to about 200° C., preferably greater than or equal to about 250° C., and even more preferably greater than or equal to about 300° C.

In general, as the feed rate of the polymer-solvent mixture is increased a corresponding increase in the screw speed must be made in order to accommodate the additional material being fed to the extruder. Moreover, the screw speed determines the residence time of whatever material is being fed to the extruder, here a polymer-solvent mixture. Thus, the screw speed and feed rate are typically interdependent. It is useful to characterize this relationship between feed rate and screw speed as a ratio. Typically the extruder is operated such that the ratio of starting material introduced into the extruder in kilograms per hour (kg/hr) to the screw speed expressed in revolutions per minute (rpm) falls about 0.0045 to about 45, preferably about 0.01 to about 0.45. For example, the ratio of feed rate to screw speed where the polymer-solvent mixture is being introduced into the extruder at 400 kilograms per hour into an extruder being operated at 400 rpm is 1. The maximum and minimum feed rates and extruder screw speeds are determined by, among other factors, the size of the extruder, the general rule being the larger the extruder the higher the maximum and minimum feed rates. In one embodiment the extruder operation is characterized by a ratio of a feed rate in kilograms per hour to an extruder screw speed in revolutions per minute, the ratio being between about 0.0045 and about 45. In an alternate embodiment the extruder operation is characterized by a ratio of a feed rate in kilograms per hour to an extruder screw speed in revolutions per minute, the ratio being between about 0.01 and about 0.45.

The devolatilization system may, optionally comprise a condensing system to collect the solvent removed by the upstream vent, downstream vent, and/or side feeder vent. The vents may be connected to a solvent removal and recovery manifold comprising solvent vapor removal lines, a condenser and a liquid solvent receiving vessel. Any solvent collection system known in the art may be used to effect the solvent recovery via the vents.

In one embodiment the superheated polymer-solvent mixture passes through the pressure control valve into the feed zone of the extruder, which due to the presence of the aforementioned vents (upstream extruder vent and/or side feeder vent) may be at atmospheric pressure. The solvent present in the superheated polymer-solvent mixture undergoes sudden and rapid evaporation thereby effecting at least partial separation of the polymer and solvent, the solvent vapors emerging through the upstream vents. Additionally, the extruder is equipped with at least one downstream vent operated at subatmospheric pressure, which serves to remove solvent not removed through the upstream vent and/or side feeder vent. One downstream vent may be used, but preferably at least two downstream vents are used. Generally, from about 50 to about 99 percent, preferably from about 90 to about 97 percent of the solvent present in the initial polymer-solvent mixture is removed through the upstream vent and/or side feeder vent and a substantial portion of any solvent remaining is removed through the downstream vent operated at subatmospheric pressure.

The vent operated at about atmospheric pressure, whether it is an upstream vent or a side feeder vent, is operated at the pressure of the surroundings (in the absence of an applied vacuum), typically about 750 millimeters of mercury (mm of Hg) or greater.

The vent operated at subatmospheric pressure, whether it is an upstream vent, side feeder vent, or downstream vent, may be maintained at less than or equal to about 750 millimeters of mercury (mm of Hg), preferably about 25 to about 750 mm Hg as measured by a vacuum gauge. Within this range, the vent may be operated at greater than or equal to about 100 mm, preferably greater than or equal to about 250 mm and even more preferably greater than or equal to about 350 mm of mercury of vacuum. Also within this range the vents may be operated at less than or equal to about 600 mm, preferably less than or equal to about 500 mm, and more preferably less than or equal to about 400 mm of mercury of vacuum.

In one embodiment, the upstream vent and side feeder vent surrounding the feed inlet of the extruder may be operated at subatmospheric pressure. In this embodiment, the pressure at the upstream vent and side feeder vent are selected and monitored during processing to prevent excessive foaming of the mixture that may result in clogging of the vents, side feeder and/or the condensing system downstream of the extruder.

In one embodiment, anti-solvent is added to the organic phase containing the poly(arylene ether) to create a partially precipitated slurry which is then fed to the devolitization extruder.

In one embodiment the polymer-solvent mixture is introduced into an evaporator, a distillation apparatus, or a second extruder to concentrate the polymer-solvent mixture prior to its introduction to the extruder. The evaporator, distillation apparatus, or second extruder is preferably upstream from the extruder and in direct communication with the extruder via a pressure control valve attached directly to the extruder.

In one embodiment the superheated polymer-solvent mixture is introduced through multiple pressure control valves located on the extruder and the side feeder. A system comprising two side feeders and two pressure control valves, the first of the pressure control valves communicating directly with the feed zone of the extruder (i.e. attached directly to the extruder), and the second of the pressure control valves being attached to one of the side feeders, the second of the pressure control valves being said to communicate with the extruder via the side feeder. Alternatively, it is possible to have a system in which there is no pressure control valve in direct communication with the extruder, having instead multiple side feeders each of which is equipped with at least one pressure control valve.

The polymer-solvent mixture that is introduced into the extruder comprises a solvent and a polymer, wherein the amount of polymer is less than or equal to about 99 weight percent based on the total of polymer and solvent. Within this range the amount of polymer may be less than or equal to about 75 weight percent, with less than or equal to about 60 more preferred, and less than or equal to about 50 weight percent based on the total of polymer and solvent more preferred. Also within this range, the weight percent of polymer may be greater than or equal to about 5, with greater than or equal to about 20 preferred, and greater than or equal to about 40 weight percent based on the total of polymer and solvent more preferred.

Polymer-solvent mixtures comprising less than about 30 percent by weight solvent are at times too viscous to be pumped through a heat exchanger, one of the preferred methods for superheating the polymer-solvent mixtures. In such instances it is possible to superheat the polymer-solvent mixture by other means, for example, heating the polymer-solvent mixture in a extruder, or a helicone mixer, or the like. The polymer-solvent mixture may be superheated by means of a first extruder. The superheated polymer-solvent mixture emerging from the first extruder may be transferred through a pressure control valve into a second devolatilizing extruder comprising a vent operated at subatmospheric pressure, optionally a vent operated at about atmospheric pressure, and a side feeder comprising a vent being operated at atmospheric pressure. In one embodiment, the die face of the first extruder may serve as the pressure control valve, which regulates the flow of superheated polymer-solvent mixture into the second devolatilizing extruder. In this embodiment, the superheated polymer-solvent mixture is introduced directly from the die face of the first extruder into the feed zone of the second devolatilizing extruder. The first extruder may be any single-screw extruder or twin-screw extruder capable of superheating the polymer-solvent mixture.

The poly(arylene ether) emerges from the extruder as an extrudate, which may be pelletized and dried before further use. In one embodiment, the extrudate may be introduced into another extruder to further aid in the removal of solvent. Thus, the extruder into which the polymer-solvent mixture is first introduced may be coupled to a second extruder, the second extruder being equipped with one or more subatmospheric or atmospheric vents for the removal of residual solvent. The second extruder may be closely coupled to the initial extruder thereby avoiding any intermediate isolation and re-melting steps. The use of a second extruder in this manner is especially beneficial during operation at high throughput rates where the residence time of the polymer in the initial extruder is insufficient to achieve the desired low level of residual solvent. The second extruder may be any vented extruder such as a vented twin-screw counter-rotating extruder, a vented twin-screw co-rotating extruder, a vented single-screw extruder, or a vented single-screw reciprocating extruder. The term vented extruder means an extruder possessing at least one vent, the vent being operated at atmospheric pressure or subatmospheric pressure. Where the extruder comprises a plurality of vents, some vents may be operated at atmospheric pressure while others are operated at subatmospheric pressure.

In another embodiment, isolation of the poly(arylene ether) from the organic phase of the reaction mixture comprises pre-concentration (partial evaporation of the solvent) and devolatilization extrusion steps. During pre-concentration, a major part of the solvent in the organic phase is removed by concentration processes and equipment described above, such as flash vessels, distillation systems, and the like. The solvent may be evaporated, preferably at an elevated temperature, for example in the range from about 150 to about 300° C., more preferably in the range of about 180 to about 260° C., and/or elevated pressure, for example in the range from about 2 to about 75 bar, more preferably in the range of about 5 to about 50 bar. Pre-concentration removes about 1 to about 99 percent of the solvent present in the organic phase. Within this range less than or equal to about 90 percent, preferably less than or equal to about 80 percent, and more preferably less than or equal to about 70 percent of the solvent is removed. Pre-concentration is followed by devolatilization extrusion to remove the residual solvent.

In one embodiment, the organic phase, which may be pre-concentrated, is heated and maintained at a temperature sufficient to facilitate the isolation devolatilization process. Heating may be performed by the use of heated tanks or vessels, shell-and-tube heat exchangers, and the like. When the organic phase is concentrated to contain greater than about 70 percent by weight solids based on the weight of the poly(arylene ether) and solvent, the concentrated organic phase may be heated by a first extruder, a helicone mixer, or the like. In an alternative embodiment, the organic phase may be superheated as described above.

In another embodiment, the organic phase comprising poly(arylene ether) obtained from the polymerization process is filtered prior to its introduction into the devolatilization extruder. Preferably the filtration system is in-line connecting a feed stream of the organic phase containing poly(arylene ether) from a reaction vessel to a devolatilization extruder. The feed stream may optionally be concentrated by a concentration means to increase the percent solids level of the poly(arylene ether) in the organic phase. If the polymer-solvent mixture is superheated prior to its introduction to the devolatilization extruder, the filtration may occur prior to or after the superheating step.

In another embodiment, the devolatilization extruder may comprise a melt filtration system to filter the melt of poly(arylene ether) as it is extruded. The melt filtration system aids in the removal of any black specks and particulates that may have formed during production or processing. Any suitable melt filtration system or device that can remove particulate impurities from a melt may be used. Preferably, the melt is filtered through a single melt filtration system, although multiple melt filtration systems are contemplated.

Suitable melt filtration systems include filters made from a variety of materials such as, for example, sintered metal, metal mesh or screen, fiber metal felt, ceramic, or a combination of the foregoing materials, and the like. Particularly useful filters are sintered metal filters exhibiting high tortuosity, including the filters prepared by PALL Corporation.

Any geometry of melt filter may be used including, for example, cone, pleated, candle, stack, flat, wraparound, screens, a combination of the foregoing, and the like.

The melt filtration system may comprise a continuous screen changing filter or batch filters. For example, continuous screen changing filters may include a ribbon of screen filter that is slowly passed before the path of a melt flow in the extruder. The filter collects particulate impurities within the melt which are then carried out of the extruder with the filter ribbon as it is continuously renewed with a new section of ribbon.

The pore size of the melt filter may be of any size ranging from about 0.5 micrometer to about 200 micrometers. Within this range, a pore size of less than or equal to about 100 micrometers can be employed, with less than or equal to about 50 micrometers preferred, and less than or equal to about 20 micrometers more preferred. Also within this range a pore size of greater than or equal to about 1 micrometer may be used, with greater than or equal to about 7 micrometers preferred, and greater than or equal to about 15 micrometers more preferred.

Upon extrusion from the devolatilization extruder, the poly(arylene ether) may be collected in the form of pellets. The polymeric material may be pelletized by any method known in the art. For example, strands of polymeric material extruded from an extruder or similar device, may be cooled in clean water baths or cooled by water spray, chopped into pellets, and dried. The pellets formed may be dried using techniques standard in the art including centrifugal dryers, batch or continuous oven dryers, fluid beds, and the like. A preferred pelletization method employs an underwater die-face pelletizer system. A suitable method of pelletizing is described in U.S. Pat. No. 6,372,175. Useful pelletizing machines, including die-face pelletizers, are described in U.S. Pat. Nos. 3,973,890, 4,421,470, and 5,607,700.

In general, the die used in any of the extruder systems discussed herein is preferably set to a temperature similar to the barrel temperature of the extruder or at a temperature higher than that of the melt temperature of the polymeric material. When a strand die is used, the die typically contains one or more holes having diameters of about 1 millimeter to about 20 millimeters (mm). Within this range, the diameter may be greater than or equal to about 2 mm, preferably greater than or equal to about 4 mm. Also within this range, the diameter may be less than or equal to about 10 mm, preferably less than or equal to 6 mm. The land length, or the length of the hole, may be about 1 to about 10 times the diameter of the hole. Within this range, a length of greater than or equal to about 2 times may be used, with greater than or equal to about 4 times preferred. Also within this range a length of less than or equal to about 8 times may be used, with less than or equal to about 6 times preferred. Any number of holes per die may be used, but a range of about 10 to about 70 kilogram per hour per hole (kg/hr/hole) is preferred. Within this range, a number of greater than or equal to about 15 kg/hr/hole may be used, with greater than or equal to about 20 kg/hr/hole preferred. Also within this range, a number of less than or equal to about 60 kg/hr/hole may be used, with less than or equal to about 45 kg/hr/hole preferred. The shape of the hole may be of any shape, such as round, oval, square, rectangular, triangular, pentagonal, hexagonal, and the like, but a round shape is preferred.

In one embodiment, any or all of the water used in the pelleting processing, such as for the cooling baths for the pelletizing or optional washing spray, is purified prior to use to remove impurities and contaminants. Methods of purifying the water include processes such as, filtration, reverse osmosis, electrolytic deionization, combinations of the foregoing processes, and the like. The water may be filtered using filters having pore sizes of submicrometer or micrometer sizes. In one embodiment, the water for the water baths and spray may be collected and recycled preferably after undergoing a purification process to remove contaminants.

It is preferable that the means for pelletizing and collecting the poly(arylene ether) polymer pellet is clean or cleaned prior to use. For instance, the pelletizer, cooling means such as water baths or water spray, pellet driers and the like are all cleaned and substantially free of dust and particulate impurities prior to the pelletizing process. It is also preferred that the collected pellets are free of any fines or small particles of polymer caused by the pelletizing process.

In one embodiment, the poly(arylene ether) may be pelletized and/or packaged in a clean room environment to prevent contamination of the polymeric material from the surroundings. Clean room components as described above may be used here. It is also preferred that the poly(arylene ether) pellets are packaged and/or stored in a container that is clean and substantially free of particulate impurities. The package or container may comprise any storage container including, for example, a silo, hopper car, dry bulk tanker or trailer, a bulk sack container such as a Super Sack®, sealable jars, and the like. It is preferable that the containers comprise sealing means (e.g. through the use of seals, closing mechanisms, etc.) to prevent the contamination of the poly(arylene ether) from the surroundings during storage and/or transport of the material.

In one embodiment, additional precautions may be taken to exclude oxygen from the devolatilization extruder and from contact with the hot polymeric material as it emerges from the extruder dieface. Such precautions may assist in preventing discoloration or the formation of black specks, especially for the poly(arylene ether) which is known to darken or otherwise degrade at high temperature in the presence of oxygen. Steps which may be taken in order to preclude the entry of oxygen into the extruder, or to preclude the exposure of the hot polymer melt emerging from the extruder dieface to oxygen include; wrapping external parts of the extruder with cladding and supplying the cladding with a positive pressure of nitrogen, enclosing with a housing supplied with a positive pressure of inert gas those sections of the extruder subject to the entry of oxygen due to the action of vacuum vents, enclosing the entire extruder in an enclosure supplied with a positive pressure of nitrogen, and the like. Additionally, steps may be taken to degas the solution of polymeric material prior to its introduction into the extruder. Degassing may be effected in a variety of ways, for example sparging the solution with an inert gas and thereafter maintaining a positive pressure of an inert gas in the vessel holding the solution.

After it has been cleaned of impurities, the poly(arylene ether), whether isolated as a powder or pellet, or in solution, is preferably maintained under conditions that will maintain the integrity of the cleanliness of the material. For instance, any or all equipment contacted by the poly(arylene ether) or poly(arylene ether) solution is preferably clean and substantially free of particulate impurities. Such equipment may be from such diverse items as a holding vessel, collection filter, plumbing, precipitate dryer, devolatilization extruder, pelletizer, transportation vessels, packaging, storage vessels/silos, and the like.

As described herein, the organic phase formed from the preparation of the poly(arylene ether) may be filtered to remove particulate impurities at any stage in the process prior to the isolation of the poly(arylene ether). Also contemplated herein are methods of removing particulate impurities from poly(arylene ether) that has been pre-isolated. Suitable methods include melt filtering the poly(arylene ether) through a melt filtration system. In another embodiment, the poly(arylene ether) may be dissolved in an appropriate solvent to form a solution, filtered, and isolated from the solution by methods similar to those described previously for the isolation of poly(arylene ether) from the organic phase of the reaction process.

Figure 2:
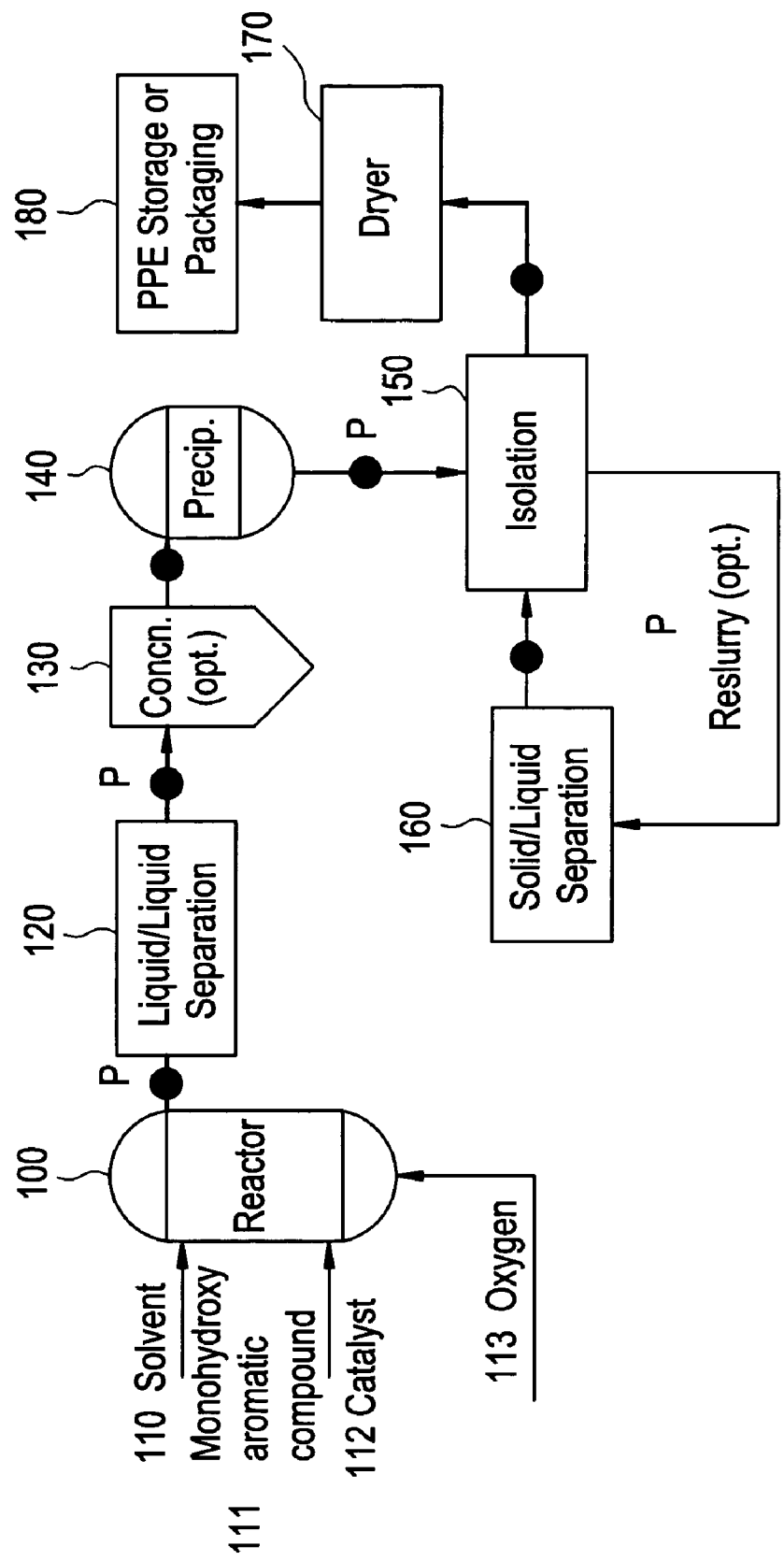
FIG. 2 illustrates an embodiment to prepare poly(phenylene ether)

FIG. 2 provides an exemplary process of forming poly (arylene ether) (as a poly(phenylene ether), PPE (180)). A solvent (110) and a catalyst (112) are charged to a clean reactor while feed streams of a monohydroxyaromatic compound (111) and an oxygen source (113) are fed to the reactor (100). When a targeted molecular weight is achieved, the addition of the oxygen source is ceased and a chelating agent is added to the reaction solution to poison the catalyst. The aqueous phase, containing chelated catalyst, is separated from the organic phase, containing poly(phenylene ether) and solvent, via a liquid/liquid separation means (120). The organic phase is optionally concentrated (130) followed by precipitation of the poly(phenylene ether) (140). The precipitated poly(phenylene ether) may be reslurried with an anti-solvent and separated by a solid/liquid separation means (160). The isolated precipitate is then dried in a dryer (170) and the poly(phenylene ether) is packaged or stored (180) until needed. The "P"s in FIG. 2 indicate locations where a purification step may take place. The circles indicate locations where poly(phenylene ether) may be used directly in the formation of a mixture of poly(phenylene ether) and poly(alkenyl aromatic).

As mentioned previously, one or both of the starting components, the poly(arylene ether) and poly(alkenyl aromatic), may be purified prior to the formation of the mixture of the two components. The term poly(alkenyl aromatic) resin as used herein includes polymers prepared by methods known in the art including bulk, suspension, and emulsion polymerization, which contain at least 25% by weight of structural units derived from an alkenyl aromatic monomer having the structure (III)

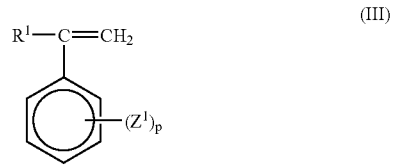

wherein $R^1$ is hydrogen, $C_1$–$C_8$ alkyl, or halogen; $Z^1$ is vinyl, halogen or $C_1$–$C_8$ alkyl; and p is 0 to 5. Preferred alkenyl aromatic monomers include styrene, chlorostyrene, and vinyltoluene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$–$C_{10}$ nonaromatic diene monomer, such as butadiene or isoprene, and wherein the rubber-modified poly(alkenyl aromatic) resin comprises about 98 to about 70 weight percent of the homopolymer of an alkenyl aromatic monomer and about 2 to about 30 weight percent of the rubber modifier, preferably about 88 to about 94 weight percent of the homopolymer of an alkenyl aromatic monomer and about 6 to about 12 weight percent of the rubber modifier. These rubber modified polystyrenes include high impact polystyrene (commonly referred to as HIPS).

The poly(alkenyl aromatic) resins also include non-elastomeric block copolymers, for example diblock, triblock, and multiblock copolymers of styrene and a polyolefin. Non-elastomeric block copolymer compositions of styrene and butadiene can also be used that have linear block, radial block or tapered block copolymer architectures wherein the butadiene component is present up to about 35 weight percent. They are commercially available from such companies as Atofina as under the trademark FINACLEAR and Chevron Phillips Chemical Company under the trademark K-RESINS.

The poly(alkenyl aromatic) resins may also include block copolymers of styrene-polyolefin-methyl methacrylate, especially poly(styrene-b-1,4butadiene-b-methyl methacrylate (SBM) available from Atofina comprising blocks of polystyrene, 1,4-polybutadiene, and syndiotactic polymethyl methacrylate. SBM block copolymers available from Atofina include AF-X223, AF-X333, AF-X012, AF-X342, AF-X004, and AF-X250.

A preferred poly(alkenyl aromatic) is a homopolymer of the alkenyl aromatic monomer (III) wherein $R^1$ is hydrogen, lower alkyl or halogen; $Z^1$ is vinyl, halogen or lower alkyl; and p is from 0 to 5. A particularly preferred homopolymer of an alkenyl aromatic monomer is the homopolymer derived from styrene (i.e., homopolystyrene). The homopolystyrene preferably comprises at least 99% of its weight, more preferably 100% of its weight, from styrene.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Atactic homopolystyrenes are sometimes referred to herein as "crystal polystyrene" resins. Useful syndiotactic polystyrene resins (SPS) are available from The Dow Chemical Company under the QUESTRA trademark.

The poly(alkenyl aromatic) may have a number average molecular weight of about 20,000–100,000 atomic mass units (amu) and a weight average molecular weight of about 10,000–300,000 amu.

Isolated poly(alkenyl aromatic) may be purified by dissolving the poly(alkenyl aromatic) in an appropriate solvent and filtering the resulting solution in a solution filtration system. The poly(alkenyl ether) may be isolated directly or the solution of the filtered poly(alkenyl aromatic) may be combined with poly(arylene ether) and a mixture of the two polymers may be isolated. In a preferred embodiment, commercially available poly(alkenyl aromatic) is used to form a poly(arylene ether)-poly(alkenyl aromatic) mixture without prior purification of the poly(alkenyl aromatic).

As mentioned previously in regards to FIG. 1, the components that make up the poly(arylene ether)-poly(alkenyl aromatic) polymeric material may be combined together in any number of ways. Solutions of poly(arylene ether) and poly(alkenyl aromatic) may be combined and the polymeric material isolated from the solution mixture. Alternatively, solid poly(arylene ether) or poly(alkenyl aromatic) may be combined with a solution of the other component. The solutions comprising an independent component may have been prepared from isolated material or are feed streams from a reactor or reaction solution. In another embodiment, solid poly(arylene ether) and poly(alkenyl aromatic) are compounded and melt blended to form a melt mixture. As described above, the starting components may have been purified prior to combining the two components. A solution containing the combined components may itself be filtered prior to isolation of the blend. Each general combination process, their variations, and other embodiments will be described in more detail below.

To form the solutions of the components, the poly(arylene ether) and/or poly(alkenyl aromatic) is combined with an appropriate solvent with mixing and optional heating. The mixing of the poly(arylene ether) and poly(alkenyl aromatic) in solution provides for the uniform and efficient dispersal of the components. The poly(arylene ether) used to make the solution may be from any available source or form such as pellet, powder, flake, and the like; or in solution as a product feed stream from a reactor or reaction vessel, directly or from a storage vessel. The formed solution may be filtered at least once prior to isolation of the polymeric material composite.

Suitable solvents for use to make the solutions of poly (arylene ether) and poly(alkenyl aromatic) include a halogenated aromatic solvent, a halogenated aliphatic solvent, a non-halogenated aromatic solvent, a non-halogenated aliphatic solvent, or a mixture thereof. Suitable halogenated aromatic solvents include, for example, halobenzenes, ortho-dichlorobenzene, chlorobenzene, and the like. Suitable halogenated aliphatic solvents include, for example, chloroform, methylene chloride, 1,2-dichloroethane, and the like. Suitable non-halogenated aromatic solvents include, for example, benzene, toluene, xylenes, anisole, nitrobenzene, and the like. Suitable non-halogenated aliphatic solvents include, for example ethyl acetate, acetone, and the like. The solvent may be the same type as the polymerization solvent employed in the process of producing the poly (arylene ether) resin and/or the poly(alkenyl aromatic).

The solution prepared may be of any percent weight level of poly(arylene ether) and poly(alkenyl aromatic) to solvent, but it may also be tailored to allow for efficient filtration of the solution based on the particular filtration system to be used. Suitable solutions may have a percent weight of about 1 to about 99 weight percent solids based on the total of the polymeric material and solvent. Within this range a weight percent of less than or equal to about 90 may be employed, with less than or equal to about 80 weight percent preferred, and less than or equal to about 70 weight percent more preferred. Also within this range a weight percent of greater than or equal to about 30 may be used, with greater than or equal to about 40 weight percent preferred, and greater than or equal to about 50 weight percent more preferred.

The solution may be heated prior to and/or during the filtration step. Suitable temperatures of the solutions prior to and/or during the filtration step may be of about 10° C. to about 250° C. depending upon the particular solvent used. Within this range, a temperature of less than or equal to about 200° C. may be employed, with less than or equal to about 180° C. preferred, and less than or equal to about 130° C. more preferred. Also within this range, a temperature of greater than or equal to about 50° C. may be employed, with greater than or equal to about 80° C. preferred, and greater than or equal to about 110° C. more preferred. Optionally, the filtration system itself may also be heated.

Suitable temperatures of the solutions prior to and/or during the filtration step may be of about 100° C. to about 170° C. for the case when ortho-dichlorobenzene solvent is used, and the solution is filtered at atmospheric pressure. Within this range, a temperature of less than or equal to about 170° C. may be employed, with less than or equal to about 160° C. preferred, and less than or equal to about 150° C. more preferred. Also within this range, a temperature of greater than or equal to about 100° C. may be employed, with greater than or equal to about 120° C. preferred, and greater than or equal to about 130° C. more preferred.

After the solution of poly(arylene ether) and poly(alkenyl aromatic) is filtered, the polymeric material may be isolated in any number of ways. There is no particular limitation on the method by which the polymeric material may be isolated from the solution or filtrate. Suitable processes known in the art to remove a solvent from a resin may be employed. Such processes include, for example, precipitation, distillation, spray drying, devolatilization, evaporation through the use of flash vessels, a combination of the foregoing, and the like. The polymeric material may be isolated in the form of a powder, flake, or pellet.

In one embodiment, the polymeric material may be isolated from the solution by precipitation of the polymeric material or removal of the solvent to result in the isolated polymeric material. General methods and equipment described above for the precipitation of poly(arylene ether)s from solution may be applied here to the polymeric material in solution.

Precipitation of the polymeric material from the solution mixture (if unfiltered) or filtrate may be performed by the addition of an anti-solvent solvent to the solution mixture or filtrate. The solution mixture or filtrate may optionally be concentrated prior to the addition of an anti-solvent. The precipitated polymeric material may be collected using any conventional collection filtration technique or solid/liquid separation technique. Suitable collection filtration apparatuses include rotating filters, continuous rotary vacuum filters, continuous moving bed filters, batch filters, and the like. Suitable solid/liquid separation apparatuses include continuous solid/liquid centrifuges.

The isolation by precipitation may, optionally, further comprise washing of the isolated, filtered polymeric material. Washing may be performed, for example, with additional anti-solvent directly on the collection filter or by mixing the powder wetcake from the collection filter or solid/liquid separation apparatus with additional anti-solvent in a stirred tank. A preferred method of washing the isolated, filtered polymeric material uses a two-stage reslurry and solid/liquid separation process scheme. In this embodiment, the wetcake from the collection filter may be washed with anti-solvent in a stirred tank; the polymeric material/solvent/ anti-solvent mixture may then be separated in a solid/liquid continuous centrifuge and the polymeric material wetcake from the centrifuge may be mixed a second time with anti-solvent in a continuous stirred tank, followed by a second solid/liquid separation in a second solid/liquid centrifuge. In the previous embodiment, the solid/liquid centrifuge may be replaced by any other solid/liquid separation apparatus or a collection filtration apparatus may be used.

The isolated polymeric material precipitate comprising poly(arylene ether) and poly(alkenyl aromatic) may be dried using the drying apparatuses discussed previously. Suitable drying apparatuses to dry the precipitated poly(arylene ether) include rotary paddle dryers, conveyer dryers, fluid-bed dryers, quiescent bed, and the like. The drying may be operated batch-wise or continuous. In a preferred embodiment, the drying is performed under an inert atmosphere, such as nitrogen, to minimize the decomposition of the polymeric material. The precipitate may be dried at an elevated temperature and/or at reduced pressures to facilitate solvent evaporation. The temperature of the drying may be carefully controlled to prevent decomposition. Temperatures for drying the precipitate may be about 50° C. to about 400° C. The dryer equipment may be modified to prevent localized amounts of poly(arylene ether) from getting trapped in the dryer apparatus resulting in material decomposition. Such modifications include, surface finishing and equipment design. In one embodiment, the drying is performed under an inert atmosphere and preferably operated under negative pressure. The dryers are preferably cleaned prior to use to remove any residues. Also any transport systems, rotary locks, and blowers should be well maintained and designed to minimize polymer powder from intruding on bearing and seal surfaces where they might melt and degrade from frictional forces.

In an alternative embodiment, the polymeric material may be isolated from the solution mixture or filtrate by a devolatilization process. The solution mixture or filtrate may optionally be pre-concentrated prior to its introduction into the devolatilization extruder. During pre-concentration, the major part of the solvent is removed by evaporation, preferably at an elevated temperature, for example in the range from about 150 to about 300° C., more preferably in the range of about 180 to about 260° C., and/or elevated pressure, for example in the range from about 2 to about 75 bar, more preferably in the range of about 5 to about 50 bar. Pre-concentration removes about 1.0 to 99 percent of the solvent present in the filtrate. Within this range less than or equal to about 90 percent, preferably less than or equal to about 80 percent, and more preferably less than or equal to about 70 percent of the solvent is removed. Pre-concentration is followed by devolatilization extrusion to remove the residual solvent.

In one embodiment, the solution mixture or filtrate is superheated prior to its introduction into the devolatilization extruder. Superheating a solution comprising polymer and a solvent has been described above.

As an alternative to completely isolating the polymeric material using a devolatilization process, one or more resins may be added to the devolatilized polymeric material in the same process. The one or more resins may be fed into the devolatilizing extruder although additional extruders may also be used. Possible variations include melt feeding the one or more resins into the devolatilizing extruder or melt feeding the polymeric material from the devolatilizing extruder into a second compounding extruder as well as combinations of these. The one or more resins can vary widely and can also include additives, such as impact modifiers, lubricants, flame retardants, pigments, colorants, and the like.

In one embodiment, a superheated solution comprising solvent and poly(arylene ether) is filtered and then fed into a devolatilization extruder. The extruder further comprises a side feeder for the addition of resins and/or additives. Preferably poly(alkenyl aromatic) is added to the extruder via the side feeder to result in a polymeric material comprising poly(arylene ether) and poly(alkenyl aromatic). In another embodiment, the poly(arylene ether) in solution is filtered then superheated and fed to a devolatilization extruder. The poly(alkenyl aromatic) is fed to the extruder using a downstream side feeder to form a polymeric material comprising poly(arylene ether) and poly(alkenyl aromatic).

In one embodiment, prior to devolatilization, the solution mixture or the filtrate is concentrated to provide a solution comprising an increased percent weight level of polymeric material as compared to the weight percent level of the polymeric material in the solution mixture or filtrate. Concentration to any percent weight level of polymeric material of about 1.0 to about 99 percent weight may be obtained. Within this range a concentration of the weight percent level of polymeric material of less than or equal to about 90 may be used, with less than or equal to about 80 weight percent preferred, and less than or equal to about 70 weight percent polymeric material based on the total weight of polymeric material and solvent more preferred. Also within this range a concentration of the weight percent level of polymeric material of greater than or equal to about 10 may be used, with greater than or equal to about 30 weight percent preferred, and greater than or equal to about 50 weight percent polymeric material based on the total weight of polymeric material and solvent more preferred.

The concentrated solution mixture or filtrate may be filtered one or more times in a solution filtration system to remove particulate impurities that may remain in solution prior to isolation of the polymeric material.

The filtration of the solutions and/or isolation of the polymeric material may be performed under an inert atmosphere, such as nitrogen, to prevent oxidative degradation processes in the polymeric material at the elevated temperatures of these operations.

The polymeric material isolated from the filtrate is preferably isolated in the form of pellets. The polymeric material may be pelletized as described above in relation to the pelletization of the poly(arylene ether). A preferred pelletization method employs an underwater die-face pelletizer system. In one embodiment, the particular equipment chosen for the pelletizer system is chosen to reduce the amount of chaff produced from the pelletizing process. It is preferable that the means for isolating the polymer product is clean or cleaned prior to use. For instance, the pelletizer, cooling means such as water baths or water spray, pellet driers and the like are all cleaned prior to the isolation of the polymeric material.

In one embodiment, all of the water used in processing, such as for the cooling baths for the pelletizing or optional washing spray, is purified prior to use to remove impurities. Methods of purifying the water include processes such as, filtration, reverse osmosis, electrolytic deionization, combinations of the foregoing processes, and the like. The water may be filtered using filters having pore sizes of submicrometer or micrometer sizes. The water used in the pelletizing process may be recycled and reused.

In one embodiment, the polymeric material may be isolated and pelletized in a clean room environment to prevent contamination of the polymeric material from the surroundings. A clean room environment as described previously may be used. In a preferred embodiment, the atmosphere in the clean room, packaging room, and or process equipment is filtered to have substantially no particles larger than about 0.45 micrometers. The room wherein the polymeric material is isolated and packed may be enclosed in a positive pressure system wherein the system's air is filtered for particulate materials. The system to isolate pellets, from the extruder die head to the screener where the pelletized polymeric material is collected into containers, may be enclosed in a positive pressure room wherein only filtered air is present. All personnel handling the isolated polymeric material preferably wear appropriate clothing to minimize contamination of the polymeric material. Suitable clothing includes hair nets or hoods, clean room coats, boots, and the like.

In one embodiment, if the polymeric material is extruded into pellets, additional precautions may be taken to exclude oxygen from the extruder and from contact with the hot polymeric material as it emerges from the extruder dieface. Such precautions may assist in preventing discoloration or the formation of black specks, especially for the poly (arylene ether) which is known to darken or otherwise degrade at high temperature in the presence of oxygen. Steps which may be taken in order to preclude the entry of oxygen into the extruder, or to preclude the exposure of the hot polymer melt emerging from the extruder dieface to oxygen include; wrapping external parts of the extruder with cladding and supplying the cladding with a positive pressure of nitrogen, enclosing with a housing supplied with a positive pressure of inert gas those sections of the extruder subject to the entry of oxygen due to the action of vacuum vents, enclosing the entire extruder in an enclosure supplied with a positive pressure of nitrogen, and the like. Additionally, steps may be taken to degas the solution of polymeric material prior to its introduction into the extruder. Degassing may be effected in a variety of ways, for example sparging the solution with an inert gas and thereafter maintaining a positive pressure of an inert gas in the vessel holding the solution.

The polymeric material, isolated as a pellet, powder, or flake, is preferably collected and stored in a clean, dust free environment. Preferably the packaging room where the polymeric material is collected and packaged comprises filtered air, free of particulate impurities. Again, suitable air filtration systems discussed in regards to the clean room environments above may apply to the packaging room. Processing and handling in a closed HEPA filtered environment.

The containers to hold the isolated polymeric material are preferably free of dust and particulate impurities. Suitable containers include, for example, a silo, a hopper car, a dry bulk tanker or trailer, a bulk sack container such as a Super Sack®, a sealable jar, and the like. Particularly suitable packaging materials include clean, dust-free plastic bags. Certified clean Super Sacks®(having a dust-free plastic liner such as polyethylene may be used. The bags and containers preferably have a sealing means (e.g. through the use of seals, closing mechanisms, etc.) to protect the polymeric material from impurities in the environment. Sealing the containers may be carried out as an automated process or the containers or packaging may be sealed or tied off manually.

In one embodiment, the poly(arylene ether) and poly (alkenyl aromatic) are compounded and/or melt blended to provide a polymeric material composite. As described herein, the melt comprising poly(arylene ether) and poly (alkenyl aromatic) may be melt filtered through a melt filtration system to remove particulate impurities, including gels and black specks. The residence time, temperature, and shear rate of the melt in the extruder is preferably controlled to minimize decomposition and or discoloration of the polymeric material, especially the poly(arylene ether) component. Therefore, it is preferable to minimize the residence time of the melt by choice of extruder screw design and by controlling the screw speed and feed rate. A residence time of less than or equal to about 5 minutes may be employed, with less than or equal to about 2 minutes preferred, and less than or equal to about 1 minute more preferred.

It is also preferable to minimize the residence time of the melt through the melt filtration system. The melt filtration system may be designed to provide short residence times based on the choice of the surface area of the filter and volume of the melt filtration housing. A higher filter surface area and a smaller housing volume can provide shorter residence times.

The melt filtration system of the extruder is preferably located at the terminal barrel of the extruder, and more preferably at the die head of the extruder. The extruder may comprise a single melt filtration system or multiple melt filtration systems.

Any type of extruder that is capable of providing a homogenous melt of poly(arylene ether), poly(alkenyl aromatic) and/or additional resins and additives, may be used. Useful types of extruders include, for example, a twin screw counter-rotating extruder, a twin screw co-rotating extruder, a single screw extruder, a single screw reciprocating extruder, a kneader, a compounder-extruder, a ring extruder, a combination of the foregoing, and the like. Preferably a single extruder may be used, but multiple extruders may be employed. Ring extruders typically comprise a ring of three to twelve small screws or grooved rolls around a static rod or core. The screws corotate and intermesh on two sides providing good dispersive and distributive mixing as well as the ability to control the residence time of the resin in the extruder. The intermeshing design also provides two clean wipes to the screw's shear, mixing, and kneading elements. Suitable ring extruders are those available from 3+ Extruder GmbH in Germany.

When preparing blends of poly(arylene ether) solvent, monomers, and other low molecular weight materials are removed from the extruder through the vent system. A particularly useful process to improve the removal of volatile substances from poly(arylene ether) or poly(arylene ether) resin blends includes steam stripping as describe in U.S. Pat. No. 5,204,410 to Banevicius et al., U.S. Pat. No. 5,102,591 to Hasson et al., U.S. Pat. No. 4,994,217 to Banevicius, and U.S. Pat. No. 4,992,222 to Banevicius et al. Steam stripping is typically performed in an extruder comprising ports for the injection of water or steam and sufficient vacuum vent capability to remove the stripped volatiles and water. Water or steam are the preferred stripping agents, and the proportion employed is up to about 15 percent by weight of the polymer composition, to be divided equally, or unequally, among the two or more injection ports located along the length of the extruder barrel. The preferred proportion is from about 0.25 to about 15 weight percent, since an amount within this range is generally very effective for removal of volatiles without burdening the vacuum system. Most preferred is from 0.5 to about 5 weight percent.

Also contemplated are extruders comprising one or more side feeders along the extruder barrel suitable to feed additional components to the melt. Additional components include additional resins, functionalizing agents and/or additives.

The extruder is preferably run at temperatures suitable to produce an intimate blend of the components that compose the melt, but low enough to prevent decomposition of the melt. A range of extruder temperatures that may be employed are of about 260° C. to about 380° C. Within this range a temperature of less than or equal to about 340° C. may be employed, and less than or equal to about 320° C. more preferred. Also within this range a temperature of greater than or equal to about 280° C. may be employed, and greater than or equal to about 290° C. preferred.

When a twin-screw extruder is employed, the extruder operation may be defined by a specific throughput rate of about 0.5 kg/hr/cm$^3$ to about 8.0 kg/hr/cm$^3$. The specific throughput rate is defined as the throughput rate of the melt divided by the diameter$^3$ of the extruder barrel. Within this range a specific throughput rate of less than or equal to about 7.5 kg/hr/cm$^3$ may be employed, and less than or equal to about 7 kg/hr/cm$^3$ preferred. Also within this range a throughput rate of greater than or equal to about 3 kg/hr/cm$^3$ may be employed, and greater than or equal to about 5 kg/hr/cm$^3$ preferred.

In one embodiment, a melt pump or gear pump is used in combination with the extruder to provide sufficient rate and pressure of a flow of melt through the melt filtration system. The melt pump also provides the capability to control and maintain an even flow of melt through the extruder system resulting in a uniform polymeric material.

In one embodiment, the poly(arylene ether), poly(alkylene aromatic), and optional additional components may be compounded prior to the melt blending step. Any known equipment capable of compounding the components may be used, for example, mixers capable of applying shear to the components, conical screw mixers, V-blenders, twin screw compounders, Henschel mixers, and the like. Preferred compounders include counter-rotating extruders or counter-rotating conical extruders.

The extruders used to perform the compounding, melt blending, and/or devolatilization steps described herein are preferably thoroughly cleaned prior to use. The screw, barrels, and die surfaces are preferably free of grooves, scratches, or pits that may collect and trap melt that may be degraded during the respective processes. Optionally, the extruders used for melt blending may be designed to provide low shear force to the melt, thereby minimizing the heat history of the polymeric material. The melt blending extruder may also comprise dispersive and/or distributive mixing elements to aid in the blending of the components while at the same time minimizing the production of gels. The screw itself may be coated with a low friction coating to prevent the trapping of polymeric material within the extruder. A self-wiping extruder may be used to prevent the trapping of polymer within the extruder.

Any suitable melt filtration system or device that can remove particulate impurities from a melt comprising poly(arylene ether) and poly(alkenyl aromatic) may be used. Preferably, the melt is filtered through a single melt filtration system, although multiple melt filtration systems are contemplated.

Suitable melt filtration systems include filters made from a variety of materials such as, for example, sintered metal, metal mesh or screen, fiber metal felt, ceramic, or a combination of the foregoing materials, and the like. Particularly useful filters are sintered metal filters exhibiting high tortuosity, including the filters prepared by PALL Corporation.

Any geometry of melt filter may be used including, for example, cone, pleated, candle, stack, flat, wraparound, screens, a combination of the foregoing, and the like.

The melt filtration system may include a continuous screen changing filter or batch filters. For example, continuous screen changing filters may include a ribbon of screen filter that is slowly passed before the path of a melt flow in an extruder. The filter collects particulate impurities within the melt which are then carried out of the extruder with the filter ribbon as it is continuously renewed with a new section of ribbon.

The pore size of the melt filter may be of any size ranging from about 0.5 micrometer to about 200 micrometers. Within this range, a pore size of less than or equal to about 100 micrometers can be employed, with less than or equal to about 50 micrometers preferred, and less than or equal to about 20 micrometers more preferred. Also within this range a pore size of greater than or equal to about 1 micrometer may be used, with greater than or equal to about 7 micrometers preferred, and greater than or equal to about 15 micrometers more preferred.

The temperature of the melt filtration system is preferably of about 260° C. to about 380° C. Within this range a temperature of less than or equal to about 340° C. may be employed, and less than or equal to about 320° C. more preferred. Also within this range a temperature of greater than or equal to about 280° C. may be employed, and greater than or equal to about 290° C. preferred.

Upon extrusion, the melt filtered polymeric material may be pelletized by methods known in the art. Exemplary methods of pelletizing have been described previously are applicable to pelletizing melt filtered polymeric material composite. Rather than extruding pellets of the polymeric material composite, the composite may be extruded as fibers, tubes, films, or sheets by appropriate choice of the die assembly. The polymeric material obtained is preferably substantially free of visible particulate impurities and/or substantially free of particulate impurities greater than about 15 micrometers.

In one embodiment, the pellets are washed and dried prior to packaging and/or storage. A suitable solvents to wash the pellets is preferably water although other solvents may be used. The washed pellets may be dried using techniques previously mentioned. The pellets may be washed to remove any fines or particulate impurities than may adhere to the surface of the pellet.

In one embodiment, the poly(arylene ether), poly(alkenyl aromatic), and optional components may be substantially free of particulate impurities prior to compounding. If the materials are substantially free of particulate impurities prior to compounding, each component will be handled and stored so as to maintain the integrity of the clean material. For instance, each component may have dedicated storage facilities which are clean and substantially free of particulate impurities. The storage and transfer of the clean components may preferably occur using filtered air. Suitable filtration systems for filtering air have been discussed previously, including HEPA filters.

In one embodiment, the polymeric material is not isolated or obtained as pellets, but is used directly in a molding process such as a direct molding process (see generally WO 02/43943 to Adedeji et al.). In one embodiment, the poly(arylene ether) and poly(alkenyl aromatic) are compounded and melt blended to form a melt that is then fed directly to a molding machine to be molded into articles.

The isolated or obtained polymeric material comprising poly(arylene ether) and poly(alkenyl aromatic) may comprise poly(arylene ether) in an amount of about 90 to about 10 weight percent and poly(alkenyl aromatic) in an amount of about 10 to about 90 weight percent, based on the total weight of the poly(alkenyl aromatic) and poly(arylene ether). Within this range the amount of poly(arylene ether) may be less than or equal to about 80 weight percent, less than or equal to about 70 weight percent preferred, and less than or equal to about 60 weight percent more preferred. Also preferred within this range the amount of poly(arylene ether) may be greater than or equal to about 20 weight percent, greater than or equal to about 30 weight percent preferred, and greater than or equal to about 40 weight percent more preferred. Within this range the amount of poly(alkenyl aromatic) may be less than or equal to about 80 weight percent, less than or equal to about 70 weight percent preferred, and less than or equal to about 60 weight percent more preferred. Also preferred within this range is an amount of poly(alkenyl aromatic) of greater than or equal to about 20 weight percent, greater than or equal to about 30 weight percent preferred, and greater than or equal to about 40 weight percent more preferred.

The isolated polymeric material composite may, optionally, further comprise an additive selected from flame retardants, mold release agents and other lubricants, antioxidants, thermal stabilizers, ultraviolet stabilizers, pigments, dyes, colorants, anti-static agents, conductive agents, fillers, and the like, and a combination comprising at least one of the foregoing additives. Selection of particular additives and their amounts may be performed by those skilled in the art. If the additives are present prior to filtration, the additive should be selected so as to not interfere with the particular filtration system chosen for the method. Also contemplated is the addition of additives after any or all of the filtration steps have been performed.

The addition of thermal stabilizers and or antioxidants to the poly(arylene ether) and or poly(alkenyl aromatic) may help to minimize the formation of decomposition products during processing. Suitable thermal stabilizers include, for example, metallic soaps, inorganic acid salts, organotin stabilizers, complex stabilizers, and the like. Suitable antioxidants include, for example, antioxidant systems comprising a free-radical inhibitor and a peroxide decomposer. Examples of antioxidants known to the art include those described in the chapter "Antioxidants" in "*Plastics Additives Handbook*, 4$^{th}$ Edition" R. Gachter and H. Muller (eds.), P. P. Klemchuck (assoc. ed.) Hansen Publishers, New York 1993.

In one embodiment, additives may be added to the polymeric material after the filtration step by methods known in the art, either prior to or post isolation of the polymeric material. Depending upon the desired use for the polymeric material, the presence of the additives must not adversely affect the surface quality of molded articles. Special processing conditions during molding may be required to ensure an adequately smooth surface when molding filled articles.

Examples of pigments and dyes known to the art include those described in the chapter "Colorants" in "*Plastics Additives Handbook*, 4$^{th}$ Edition" R. Gachter and H. Muller (eds.), P. P. Klemchuck (assoc. ed.) Hansen Publishers, New York 1993.

Suitable colorants include organic and inorganic pigments and dyes. Suitable inorganic colorants include carbon black, iron oxide, titanium dioxide, zinc oxide, zinc sulfide, and the like. Suitable organic colorants include those from the following chemical classes: anthanthrone, anthraquinone, benzimidazolone, diketopyrrolo-pyrrole, dioxazine, diazo, indanthrone, isoindoline, isoindolinone, naphthol, perinone, perylene, phthalocyanine, pyranthrone, quinacridone, quinophthalone, and the like.

The polymeric material may also comprise flame retardants including non-halogenated flame retardants such as phosphate flame retardants, and halogenated flame retardants. Examples of suitable flame retardants include those found under the chapter "Flame Retardants" in "*Plastics Additives Handbook*, 4$^{th}$ Edition" R. Gachter and H. Muller (eds.), P. P. Klemchuck (assoc. ed.) Hansen Publishers, New York 1993.

In one embodiment, articles are made from the polymeric material composite prepared by any one of the methods presented herein. Particularly preferred articles include data storage media or data storage media substrates, such as for example, optical, magneto or magneto-optical data storage media. Such media include compact discs, re-writable compact discs, digital versatile disks, high density disks for data archival technology (DVR, such as BLU-RAY DISC), and the like. A preferred data storage media that may be prepared from the polymeric material described herein is disclosed in application Ser. No. 10/648,609 entitled "Substrate and storage media for data prepared therefrom" filed Aug. 26, 2003, and copending with the present application.

The articles may be made by a variety of molding and processing techniques. Suitable techniques to form articles include injection molding, foaming processes, injection-compression, rotary molding, two shot molding, microcellular molding, film casting, extrusion, press molding, blow molding, direct molding, and the like. A preferred technique is injection molding.

If the polymeric material composite is used to form data storage media substrate, for example, additional processing such as electroplating, coating techniques (spin coating, spray coating, vapor deposition, screen printing, painting, dipping, sputtering, vacuum deposition, electrodeposition, meniscus coating, and the like), lamination, data stamping, embossing, surface polishing, fixturing, and combinations comprising at least one of the foregoing processes, among others conventionally known in the art, may be employed to dispose desired layers on the polymeric material substrate. Essentially, the substrate may optionally be formed, in situ, with the desired surface features disposed thereon on one or both sides, a data storage layer such as a magneto-optic material also on one or both sides, and an optional protective, dielectric, and/or reflective layers. The substrate can have a substantially homogenous, tapered, concave, or convex geometry, with various types and geometries of reinforcement optionally employed to increase stiffness without adversely effecting surface integrity and smoothness.

An example of a polymeric material storage media comprises an injection molded polymeric material substrate that may optionally comprise a hollow (bubbles, cavity, and the like) or filler (metal, plastics, glass, ceramic, etc., in various forms such as fibers, spheres, etc.) core. Disposed on the substrate are various layers including: a data layer, dielectric layer(s), a reflective layer, and/or a protective layer. These layers comprise conventional materials and are disposed in accordance with the type of media produced. For example, for a first surface media, the layers may be protective layer, dielectric layer, data storage layer, dielectric layer, and then the reflective layer disposed in contact with the substrate.

Figure 3:
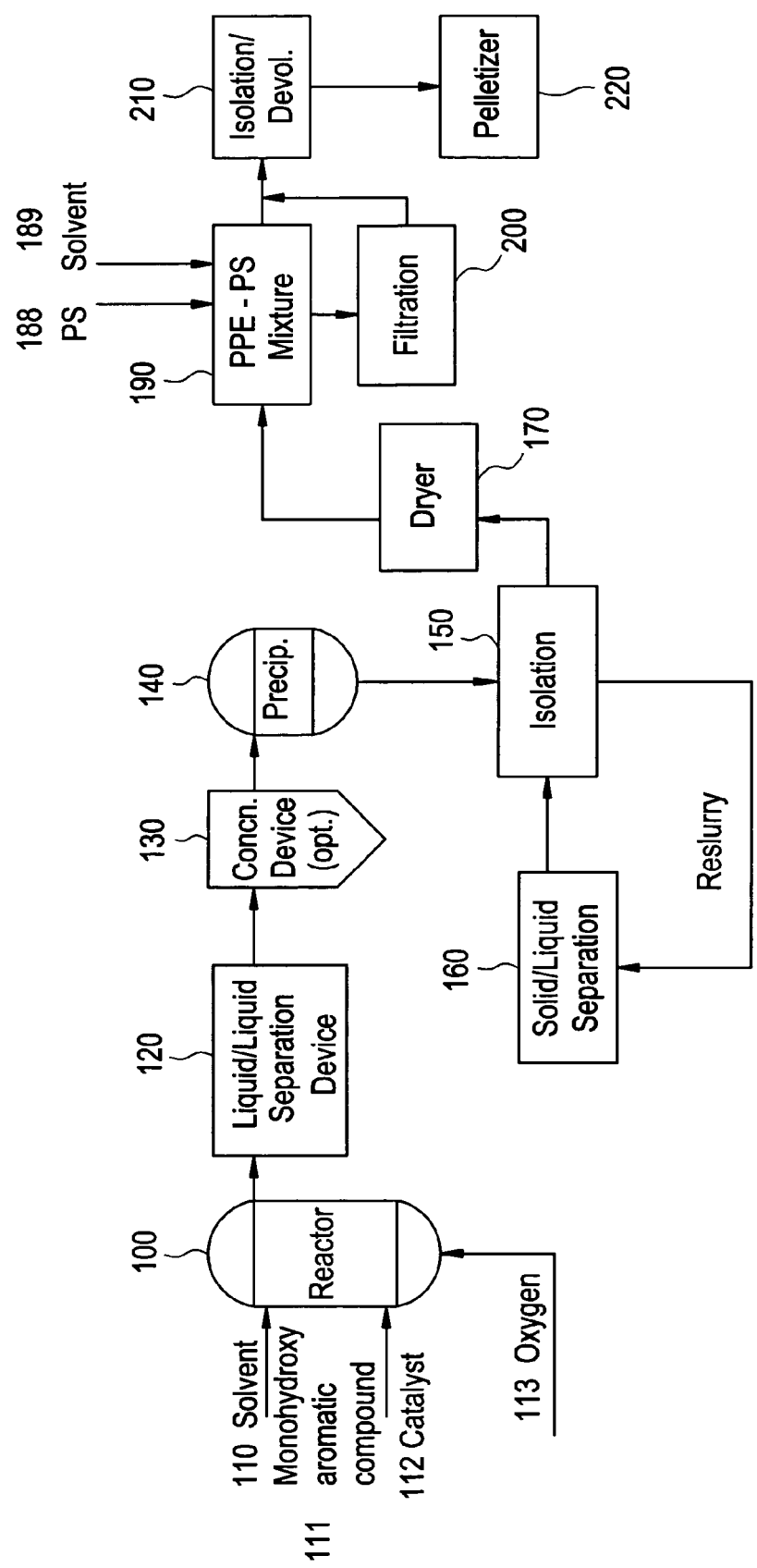
FIGS. 3–5 illustrate various embodiments to prepare clean polymeric material comprising poly(phenylene ether) and polystyrene.

FIG. 3 provides an exemplary process of forming a clean poly(phenylene ether) (PPE), polystyrene (PS) composite. The preparation of PPE is described as before, but with two reslurry steps. After the PPE is dried (170) it is combined with PS (188) and solvent (189) to form a PPE-PS mixture (190). The mixture (190) is optionally filtered (200) and the (filtered) mixture is sent to a devolatilization process (210) to isolate the polymeric material. The polymeric material is finally pelletized (220).

Figure 4:
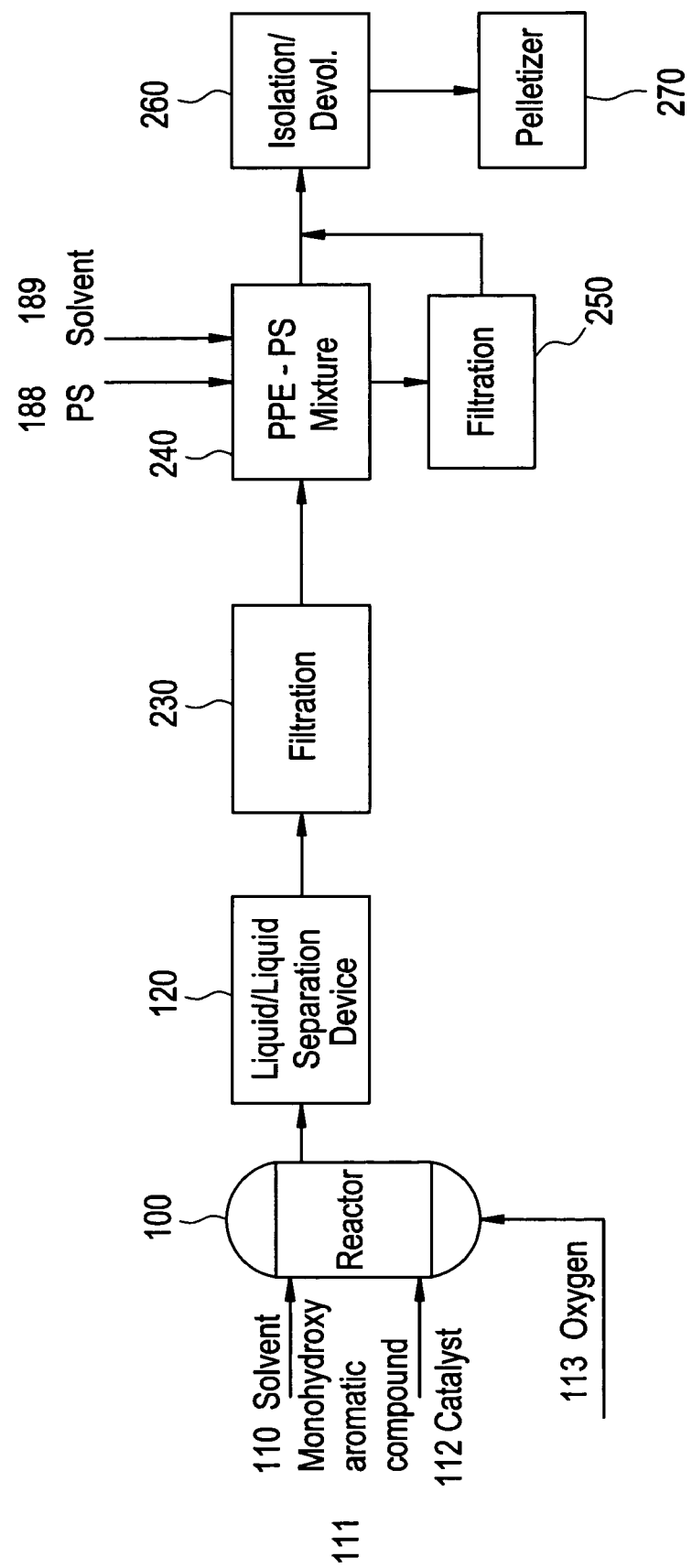

FIG. 4 also provides an exemplary process of forming a clean poly(phenylene ether) (PPE), polystyrene (PS) composite. The preparation of PPE is described as before, but the organic phase is separated (120) from the reaction mixture and filtered (230). After filtering, the filtered organic phase comprising PPE is mixed with PS (188) and solvent (189) to form a PPE-PS mixture (240). This mixture (240) is optionally filtered and the (filtered) mixture is sent to a devolatilization process (260) to isolate the polymeric material. The polymeric material is finally pelletized (270).

Figure 5:
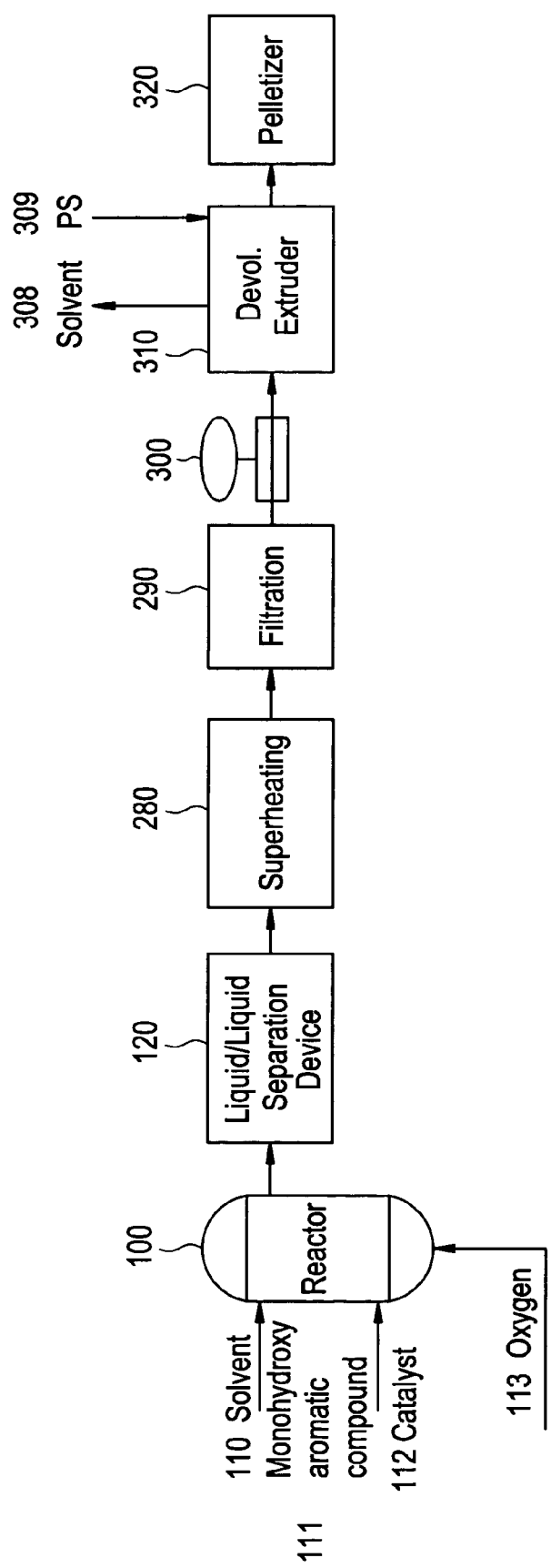

FIG. 5 further provides an exemplary process of forming a clean poly(phenylene ether) (PPE), polystyrene (PS) composite. The preparation of PPE is described as before, but the organic phase is separated (120) from the reaction mixture and superheated (280). The superheated organic phase is then filtered (290) and fed to a devolatilization extruder (310) via a pressure control valve (300). Solvent (308) is removed by the devolatilization process. PS is added to the extruder through a side feeder and the resulting polymeric material comprising PPE and PS is pelletized (320).

In one embodiment, a method of preparing a polymeric material comprises reacting a monohydroxy aromatic compound in the presence of a catalyst, oxygen, and a solvent to form a reaction mixture comprising an organic phase and an aqueous phase, wherein the organic phase comprises solvent and poly(arylene ether); separating the organic phase from the aqueous phase; filtering the organic phase through a first filtration system to remove particulate impurities; combining the organic phase with a poly(alkenyl aromatic) to form a mixture; filtering the mixture through a second filtration system to remove particulate impurities; feeding the filtered mixture to a devolatilization system to separate the solvent from a polymeric material; and pelletizing the polymeric material, wherein the polymeric material comprises poly (arylene ether) and poly(alkenyl aromatic), and wherein the polymeric material is substantially free of particulate impurities.

In one embodiment, a method of preparing a polymeric material comprises reacting a monohydroxy aromatic compound in the presence of a catalyst, oxygen, and a first solvent to form a reaction mixture comprising an organic phase and an aqueous phase, wherein the organic phase comprises a first solvent and poly(arylene ether); separating the organic phase from the aqueous phase; concentrating the organic phase to form a concentrated organic phase; filtering the concentrated organic phase through a first filtration system to remove particulate impurities; precipitating the poly(arylene ether) from the concentrated organic phase to form a first wetcake; washing the wetcake to form a washed wetcake; drying the washed wetcake to form powdered poly(arylene ether); combining powdered poly(arylene ether), poly(alkenyl aromatic), and a second solvent to form a mixture; filtering the mixture through a filtration system to remove particulate impurities; feeding the filtered mixture to a devolatilization system to separate the second solvent from the poly(arylene ether) and poly(alkenyl aromatic) to form a polymeric material; and pelletizing the polymeric material, wherein the polymeric material comprises poly(arylene ether) and poly(alkenyl aromatic), and wherein the polymeric material is substantially free of particulate impurities.

In another embodiment, a method of preparing a polymeric material comprises reacting a monohydroxy aromatic compound in the presence of a catalyst, oxygen, and a solvent to form a reaction mixture comprising an organic phase and an aqueous phase, wherein the organic phase comprises solvent and poly(arylene ether); separating the organic phase from the aqueous phase; superheating the organic phase; filtering the superheated organic phase through a filtration system to form a filtrate; feeding the filtrate to an extruder, wherein the extruder comprises an upstream vent and a downstream vent; removing solvent from the filtrate via the upstream vent and the downstream vent; feeding poly(alkylene aromatic) to the extruder via a side feeder; isolating a polymeric material, wherein the polymeric material comprises poly(arylene ether) and poly (alkenyl aromatic), and wherein the polymeric material is substantially free of particulate impurities. Optionally, the previous embodiment further comprises isolating the polymeric material in the form of a pellet.

In another embodiment, a method of preparing a polymeric material comprises melt blending poly(arylene ether) and poly(alkenyl aromatic) to form a melt, filtering the melt through a melt filtration system to remove particulate impurities; pelletizing the filtered melt to form pellets of a polymeric material comprising poly(arylene ether) and poly (alkenyl aromatic); packaging the pellets in clean containers, wherein the melt blending, the pelletizing, the packaging, or a combination of the foregoing steps are performed in an environment substantially free of particulate impurities.

In yet another embodiment, a method of preparing a polymeric material comprises reacting a monohydroxy aromatic compound in the presence of a catalyst, oxygen, and a solvent to form a reaction mixture comprising a poly (arylene ether); combining the poly(arylene ether) with a poly(alkenyl aromatic) to form a mixture; isolating a polymeric material from the mixture, wherein the polymeric material comprises poly(arylene ether) and poly(alkenyl aromatic); purifying the monohydroxy aromatic compound, the solvent, the reaction mixture, the poly(arylene ether), the poly(alkenyl aromatic), the mixture, the polymeric material, or a combination of the foregoing resulting in the polymeric material substantially free of visible particulate impurities; and packaging or storing the polymeric material.

All cited patents, patent applications, and other references are incorporated herein by reference in their entirety. The invention is further illustrated by the following non-limiting examples.

EXAMPLES

One example (Example 1) and one comparative example (Comparative Example 1) were prepared to demonstrate the effect of filtering solutions of polyphenylene ether-polystyrene resin blends on the amount of particulate impurities of the resulting isolated material.

Example 1

A 40/60 by weight blend of polyphenylene ether (PPE, 0.33 IV PPE powder available from GE Plastics) and polystyrene (xPS, L3050) was prepared according to the following procedure. To a pre-heated (about 125° C.) nitrogen blanketed, stirred amount of reagent-grade ortho-dichlorobenzene (ODCB) was added 72.6 kilograms (kg) of PPE powder and 108.9 kg of xPS, to form a solution containing 20 percent by weight solids. The solution was heated to about 170° C. and gravity filtered through a 5-micrometer size filter bag.

After the first filtration step was completed, a portion of the ODCB was removed by distillation to pre-concentrate the 20 percent by weight solids solution to a polymer-solvent mixture containing about 40 percent by weight solids. The polymer-solvent mixture was charged to a feed tank and maintained at a temperature of about 160° C. and a pressure of about 80 psig (5.6 kg/cm$^2$) under nitrogen. A gear pump was used to transfer the polymer-solvent mixture at a rate of about 72 pounds of solution per hour (32.7 kg/hr) to a shell-and-tube heat exchanger maintained at about 310° C. (590° F.). Nitrogen was used to provide enough pressure (about 80 psig, 5.6 kg/cm$^2$) to feed the pump head of the gear pump.

The polymer-solvent mixture emerged from the heat exchanger having a temperature of about 270–280° C. and was fed through a parallel combination of two sintered metal filters (PALL, 13-micrometer size pleated filters, surface area of about 1.5 ft$^2$ per filter (0.14 m$^2$) to remove particulate impurities within the feed solution. The temperature of the filter housings was maintained at about 280° C.

The filtered polymer-solvent mixture was then fed through a pressure control flash valve plumbed into the downstream edge of barrel 2 of a 10 barrel, 25 mm diameter, twin-screw, co-rotating intermeshing extruder having a L/D ratio of about 40. The temperature of the solution at the pressure-control flash valve was about 280–285° C. The extruder was operated at a screw speed of about 575 rpm and at about 20 percent drive torque. The measured extruder barrel temperatures were 321, 299, 318, 291, 290, 290, 289, and 290° C. (die).

The extruder was equipped with a closed chamber upstream of barrel 1, the closed chamber having a nitrogen line adapted for the controlled introduction of nitrogen gas before and during the solvent removal process. The extruder was further equipped at barrel 2 with a side feeder positioned orthogonal to the barrel of the extruder. The side feeder was not heated, had a L/D of about 10, and comprised two screws consisting of forward conveying elements only. At the end most distant from the extruder barrel, the side feeder was equipped with a single atmospheric vent (vent 1). The conveying elements of the screws of the side feeder were configured to convey toward the extruder and away from the side feeder vent.

The extruder was further equipped with two additional atmospheric vents at barrel 1 (vent 2), and barrel 4 (vent 3), and three vacuum vents (vents operated at subatmospheric pressure) at barrel 5 (vent 4), barrel 7 (vent 5) and barrel 9 (vent 6). The three atmospheric vents, two on the extruder and one on the side feeder, were each connected to a solvent removal and recovery manifold comprising solvent vapor removal lines, a condenser and liquid solvent receiving vessel. The vacuum vents were similarly adapted for solvent recovery. Vents 3, 4, 5 and 6 were equipped with Type "C" inserts. Vents 1 and 2 were not equipped with a vent insert.

The extruder screw elements consisted of both conveying elements and kneading elements. All of the conveying elements in both the extruder and the side feeder were forward flighted conveying elements. Kneading elements used included neutral, forward flighted and rearward flighted kneading elements depending on function. In barrels 2 and 3 of the extruder, kneading blocks consisting of forward and neutral flighted kneading elements were employed. The extruder screws were equipped with melt seals consisting of kneading blocks made up of rearward flighted kneading elements. The melt seals were located at barrels 5, and 8. The vacuum vents were located downstream of the melt seals on barrel 5, barrel 7 and barrel 9, and were operated at vacuum levels of about 28 inches of mercury (Hg) (711.2 mm of Hg; a vacuum gauge indicating full vacuum, or zero absolute pressure, would read about 30 inches of mercury or 762 mm of Hg).

Shell-and-tube heat exchangers were used as condensers to recover the ODCB solvent removed in the process. A slight vacuum (about 1 inch Hg, 25.4 mm of Hg) was applied to the heat exchanger receiving solvent vapor from the atmospheric vents to evacuate the solvent vapors. The devolatilized PPE-xPS resin which emerged from the die face (melt temperature about 310° C.) of the extruder was stranded and pelletized.

Prior to the run, the extruder was thoroughly cleaned by submitting the screws, vent port adaptors, vent inserts, die head/plate to an 454° C. sand-bath, and the extruder barrels were brushed prior to reassembly. The vacuum vents ran clean throughout the run, as determined by visual inspection at least every 15 minutes during the 12-hour long run. Only one filter housing was used for the entire 12-hour experiment. The differential pressure across the filter was constant throughout the run. Table 1 provides the processing data for Example 1.

TABLE 1

| Example | Solution Mass Flow Rate (kg/hr) | Torque (%) | Melt Temp (° C.) | Screw speed (rpm) | Actual Barrel Temperatures (° C.) |
|---|---|---|---|---|---|
| 1 | 32.7 | 20 | 310 | 575 | 321/299/318/291/290/ 290/289/290 (die) |
| CE-1 | 13.9–15.9 | 20 | 305 | 450 | 317/289/289/290/290/ 290/281/290 |

TABLE 1-continued

| Example | Temp. of Solution at Feed Tank (° C.) | Feed after Heat Exchanger (° C.) | Oil for Heat Exchanger (° C.) | Temp. of Feed at Pressure valve (° C.) |
|---|---|---|---|---|
| 1 | 160 | 270–280 | 310 | 280–285 |
| CE-1 | 162 | | | |

Comparative Example 1 (CE-1) was prepared similarly to Example 1, with some modifications, most importantly the PPE-xPS solution was filtered only once by gravity filtration through a filter bag. Additionally, the solution was not super-heated prior to its incorporation to the extruder used for isolation. A solution of PPE-xPS was prepared by combining 12.1 kg of 0.33 IV PPE powder and 18.1 kg of L3050 grade xPS in enough ODCB to form a 10 percent by weight solids solution. The resulting solution was heated to about 170° C. and gravity filtered through a 5-micrometer sized filter bag. The filtrate was concentrated to about a 40 percent by weight solids solution by removal of ODCB by distillation.

The solution was not superheated in a shell-and-tube heater and was not filtered through a combination of two sintered metal filters prior to isolation of the polymeric material from the solvent. Isolation of the polymeric material was performed in a 25 mm-diameter twin-screw, co-rotating intermeshing extruder having 10 barrels (L/D=40); a 2-hole die plate; and six vents, two of which were located upstream of the feed port and operated at atmospheric pressure, and the other four vents were located downstream of the feed port and operated at relatively high levels of vacuum (about 28 inches of mercury (711.2 mm of Hg)). The atmospheric vents 1 and 2 were located at extruder barrel 1 and on a side feeder connected to barrel 2 of the extruder, respectively. The feed solution was added directly to the extruder at an injection port located at the downstream edge of barrel number 2. A side feeder, operated as a vent, was connected to the extruder at barrel number 2. Finally, the extruder was not cleaned prior to the run, but was purged for some time with the same solution used as the feed. Processing conditions for Comparative Example 1 can be found in Table 1.

Isolated PPE-xPS of Example 1 and Comparative Example 1 were tested for amounts of particulate impurities present in the filtered material. A particulate count of visible particulates was determined according the following procedure. Six, two ounce sample bottles with polyseal caps were subjected to a stream of filtered air to remove any particles present. The bottles were then rinsed with a small amount of chloroform ($CHCl_3$). Fifty milliliters (mL) of the $CHCl_3$ was added to each sample bottle and cap. Using a lightbox, the number of visible specks or fibers was recorded for each $CHCl_3$ blank. A 10.00 gram amount of each sample was weighed out on a clean aluminum pan and added to the bottles containing $CHCl_3$. Two samples of each isolated polymeric material were prepared along with two blanks. The samples were allowed to dissolve and then viewed in the lightbox for the presence of visible specks. The results of the visible particle analysis for the blank, Example 1, and Comparative Example 1 are found in Table 2.

Particulate impurities ranging in size from 5 to 100 micrometers present in the filtered materials were detected using a Pacific Instruments ABS2 analyzer which employs a laser light scattering technique. A 16.0 gram sample from Example 1 was dissolved in 400 mL of $CHCl_3$ contained in a clean polyethylene bottle. This procedure was repeated with the Comparative Example material. A 20 mL quantity of each sample solution was allowed to flow through the ABS2 analyzer detector at a flow rate of 1 mL/minute (+/−5%). The amount particulates ranging in size of about 5 to about 100 micrometers present in the sample was measured in the detector during this process. Five samples are taken from each bottle and averaged to yield the final particle size number. The results of the ABS2 analyzer particulate analysis for Example 1 and Comparative Example 1 are found in Table 2.

throughout the run, about every half hour. The extruder processing conditions are provided in Table 3.

The procedure of Example run 2 was repeated for Example run 3 except that a 30 mm compounder was employed. The extruder processing conditions for Example run 3 are also provided in Table 3.

The procedure of Example run 2 was repeated for Example runs 4 and 5. The PPE-xPS formulation for Example runs 4 and 5 was a 50/50 percent by weight blend of 0.33 IV PPE and EB3300 grade xPS (Mw 276,000, Mn 51,500, Mw/Mn 5.36; available from Chevron Phillips Chemical). A 40 mm compounder was used for Example run 4, while a 30 mm compounder was used for Example run 5.

TABLE 2

| Visible Particles Particle size (micrometers) | Example 1 | | Comparative Example 1 | | Blank |
|---|---|---|---|---|---|
| | 3 Raw Data Particles/ml | 3 Blank Corrected Particles/gram | 3 Raw Data Particles/ml | 4 Blank Corrected Particles/gram | 1 Raw Data Particles/ml |
| 5 | 21.872 | 456.4 | 64.32 | 1517.60 | 3.616 |
| 10 | 4.12 | 82.4 | 10.736 | 247.80 | 0.824 |
| 15 | 1.912 | 39.6 | 2.264 | 48.40 | 0.328 |
| 20 | 1.704 | 20.4 | 1.848 | 24.00 | 0.888 |
| 30 | 0.44 | 2.2 | 0.848 | 12.40 | 0.352 |
| 40 | 0.04 | −3.2 | 0.072 | −2.40 | 0.168 |
| 50 | 0.408 | 4.2 | 0.707 | 11.68 | 0.24 |
| 100 | 0.336 | 6.6 | 0.224 | 3.80 | 0.072 |

The results of the above experiments show that the method used in Example 1 resulted in PPE-xPS material having significantly reduced amounts of particulate impurities when compared to Comparative Example 1. The additional filtration of the solution of Example 1 through a 13 micrometer sintered metal filter resulted in a material having greatly reduced amounts of particulate impurities having sizes of 15 micrometers or smaller. Example 1 further illustrates the isolation/devolatilization of a relatively low weight percent solids solution comprising polyphenylene ether and polystyrene. The superheating of the polymer-solvent mixture allows for the efficient removal of solvent at twice the flow rate of Comparative Example 1 to provide an isolated polyphenylene ether-polystyrene composite.

Four example runs (Example runs 2–5) were performed to illustrate the method of melt filtering a melt comprising polyphenylene ether and polystyrene to form a polymeric material having reduced levels of particulate impurities.

Example run 2: A 40/60 percent by weight blend of polyphenylene ether (PPE, powder, 0.33 IV available from GE Plastics) and polystyrene (xPS, Novacor 2272; Mw 214,000, Mn 71,600, Mw/Mn 2.99; available from Nova Chemical) was compounded in a 40 millimeter (mm) compounder with a vacuum vent. A vacuum was applied to the vent at about 20 inches of mercury (508 millimeters of Hg). The compounded material was fed to a single screw extruder equipped with 3 barrels (zones). The extruder was equipped with a sintered metal filter (PALL, 3 micrometer pores, candle geometry) located at the extruder die head.

The extruded melt strands were run through a clean, filtered water bath, the water having been filtered through a 10 micrometer filter to remove rust and impurities. The cooled strands of extruded polymeric material were dried and pelletized. Batches of the extruded melt were collected The processing conditions for Example runs 4 and 5 are provided in Table 3. For all of the Examples the drive, rate, pressure, and melt temperature are averaged for the entire run.

TABLE 3

| | Example | | | |
|---|---|---|---|---|
| | 2 | 3 | 4 | 5 |
| Zone 1 (° C.) | 232 | 232 | 232 | 232 |
| Zone 2 (° C.) | 260 | 260 | 260 | 260 |
| Zone 3 (° C.) | 277 | 277 | 277 | 277 |
| Filter 1 (° C.) | 277 | 277 | 277 | 277 |
| Filter 2 (° C.) | 277 | 277 | 277 | 277 |
| Die (° C.) | 277 | 277 | 277 | 277 |
| Screw (rpm) | 85 | 100 | 85 | 85 |
| Drive (amps) | 8.0 | 7.4 | 10.0 | 11.0 |
| Rate (kg/hr) | 6.1 | 6.9 | 7.0 | 6.8 |
| Filter In Press. (kg/cm$^2$) | 198 | 227 | 201 | 275 |
| Filter Out Press. (kg/cm$^2$) | 26 | 14 | 25 | 27 |
| Filter In Melt Temp. (° C.) | 278 | 318 | 279 | 281 |
| Filter Out Melt Temp. (° C.) | 292 | 298 | 296 | 296 |
| Visible Specks (avg.) | 3.3 | 2 | 1.6 | 1.7 |
| Filter Type/pore size (micrometer) | PALL candle, 3 | PALL candle, 3 | PALL candle, 3 | PALL candle, 3 |

Samples from the runs of Examples 2–5 were tested for visual particulates according to the following procedure. Samples of polymeric material for each run were taken about every half hour for each of the Example runs (2–5). Each sample was tested twice for visible particulates. Two ounce sample bottles with polyseal caps were subjected to a stream of filtered air to remove any particulates present. The bottles were then rinsed with a small amount of HPLC grade chloroform ($CHCl_3$). Fifty milliliters (ml) of HPLC grade CHCl$_3$ was added to each sample bottle. Using a lightbox, the number of visible specks or fibers was recorded for each CHCl$_3$ blank. A 10.00 gram amount of a sample was weighed out on a clean aluminum pan and added to one of the bottles containing CHCl$_3$. This procedure was repeated for every sample. The samples were allowed to dissolve and then viewed in the lightbox for the presence of visible specks. An average number of specks were calculated for each run, four runs total (Examples 2–5). The results of the visible particle analysis for Example runs 2–5 are found in Table 4.

Two samples from Example run 3 (Ex. 3, S1 and Ex. 3, S2), one sample from Example run 4 (Ex. 4, S1), and two samples from Example run 5 (Ex. 5, S1 and Ex. 5, S2) were tested for particulate content according to the procedure below. Amounts of particulates having sizes ranging from 5 micrometers to 100 micrometers were determined using a Pacific Instruments ABS2 analyzer which employs a laser light scattering technique. A 40.0 gram amount of each sample was dissolved in 400 ml of HPLC grade CHCl$_3$ contained in a clean polyethylene bottle. A 20 ml quantity of each sample solution was allowed to flow through the ABS2 analyzer detector at a flow rate of 1 ml/minute (+/−5%). The amount of particulates of varying sizes present in the sample was measured in the detector during this process. Each sample was tested five times and averaged to yield a final number. Two comparative examples were prepared and tested. Comparative Example 2 (CE 2) was an unfiltered blend of 50/50 weight percent 0.33 IV PPE/EB3300 grade xPS. Comparative Example 3 (CE 3) was optical quality polycarbonate (OQ-PC, LEXAN® 1050 available from GE Plastics). The results of the ABS2 analyzer particle analysis in particles per gram can be found in Table 4, along with the blank data (CHCl$_3$ alone).

TABLE 4

| Example, Sample # | Particulate Size (micrometers) | | | | | | | |
|---|---|---|---|---|---|---|---|---|
| | 5 | 10 | 15 | 20 | 30 | 40 | 50 | 100 |
| | Particles per gram | | | | | | | |
| Ex. 3, S1 | 654.3 | 111 | 38.7 | 23.3 | 3.2 | 0.9 | 1.2 | 0.1 |
| Ex. 3, S2 | 561.8 | 91.1 | 34.4 | 16.5 | 1.9 | 0.4 | 0.6 | 0.1 |
| Ex. 4, S1 | 689.8 | 90 | 32.7 | 15.6 | 2.6 | 0.5 | 0.4 | 0.1 |
| Ex. 5, S1 | 1919.9 | 143.7 | 44.3 | 20.1 | 2.4 | 0.6 | 0.2 | 0 |
| Ex. 5, S2 | 1117.5 | 114.8 | 42.9 | 26.6 | 3.6 | 1.8 | 0.2 | 0 |
| CE 2 | 6901.25 | 1237.5 | 500 | 396.25 | 85 | 23.75 | 30 | 5 |
| CE 3 | 317.000 | 58.88 | 52.88 | 14.88 | 3.38 | 0.75 | 0 | 0 |
| CHCl$_3$ | 15.15 | 3.65 | 1.25 | 0.25 | 0 | 0 | 0 | 0 |

The results of the above experiments show a significant reduction of particulate impurities between the unfiltered sample (CE 2) and the corresponding filtered samples (Ex. 4, S1; Ex. 5, S1; and Ex. 5, S2). Furthermore, the particulate impurity level of the Examples of the present method is comparable to or better than OQ-PC with regard to particulates of 15 micrometers or greater.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of preparing a polymeric material, comprising:
    reacting a monohydroxy aromatic compound in the presence of a catalyst, oxygen, and a solvent to form a reaction mixture, wherein the monohydroxy aromatic compound, the solvent, or a combination of the foregoing is optionally purified prior to reacting;
    adding water and a chelating agent to the reaction mixture to form an aqueous phase and an organic phase, and separating the aqueous phase from the organic phase, wherein the organic phase comprises poly(arylene ether);
    optionally filtering the organic phase through a first filtration system to remove particulate impurities;
    isolating poly(arylene ether) from the organic phase;
    combining the poly(arylene ether) with a poly(alkenyl aromatic) to form a mixture, wherein the mixture is optionally purified;
    optionally purifying the poly(alkenyl aromatic) prior to the combining;
    obtaining a polymeric material from the mixture, wherein the polymeric material comprises poly(arylene ether) and poly(alkenyl aromatic); and
    wherein the polymeric material is substantially free of visible particulate impurities.

2. The method of claim 1, wherein the poly(alkenyl aromatic) is in the form of a solution, melt, or solid.

3. The method of claim 1, wherein the poly(arylene ether) is in the form of a solution, melt, or solid.

4. The method of claim 1, wherein the first filtration system comprises a filter having a pore size of about 0.01 to about 50 micrometers.

5. The method of claim 1, wherein the first filtration system comprises a sintered metal filter, a cloth filter, a fiber filter, a paper filter, a pulp filter, a metal mesh filter, a ceramic filter, or a combination comprising at least one of the foregoing filters.

6. The method of claim 1, wherein the first filtration system comprises a filter having a geometry that is cone, pleated, candle, stack, flat, wraparound, or a combination comprising at least one of the foregoing geometries.

7. The method of claim 1, further comprising washing the organic phase with an aqueous solvent.

8. The method of claim 1, further comprising concentrating the organic phase by removing solvent to form a concentrated organic phase.

9. The method of claim 8, further comprising filtering the concentrated organic phase through a second filtration system to remove particulate impurities.

10. The method of claim 1, wherein the poly(arylene ether) is in the form of a solid, and wherein the solid poly(arylene ether) is a powder formed by precipitation of poly(arylene ether) from the organic phase.

11. The method of claim 10, further comprising reslurrying the precipitated poly(arylene ether) with a solvent prior to isolating.

12. The method of claim 10, further comprising drying the poly(arylene ether) powder formed by precipitation.

13. The method of claim 12, wherein the poly(arylene ether) is precipitated, collected, and dried in an environment substantially free of particulate impurities.

14. The method of claim 1, further comprising transporting and storing the poly(arylene ether) in an environment substantially free of particulate impurities.

15. The method of claim 1, filtering the poly(arylene ether), poly(alkenyl aromatic), or both to remove particulate impurities prior to the combining step.

16. The method of claim 1, wherein the polymeric material is substantially free of particulate impurities greater than about 15 micrometers.

17. The method of claim 1, wherein the mixture is formed by melt blending poly(arylene ether) and poly(alkenyl aromatic) to form a melt mixture.

18. The method of claim 17, further comprising melt filtering the melt mixture through a melt filtration system.

19. The method of claim 18, wherein the melt filtration system comprises a sintered metal filter, a metal mesh filter, a fiber metal felt filter, a ceramic filter, or a combination of the foregoing filters.

20. The method of claim 18, wherein the melt filtration system comprises a filter having a geometry that is cone, pleated, candle, stack, flat, wraparound, or a combination comprising at least one of the foregoing geometries.

21. The method of claim 18, wherein the melt filtration system comprises a filter having a pore size of about 0.5 to about 200 micrometers.

22. The method of claim 18, wherein the melt filtration system is maintained at a temperature of about 260° C. to about 380° C.

23. The method of claim 18, wherein the melt blending occurs in a twin screw counter-rotating extruder, a twin screw co-rotating extruder, a single screw extruder, a single screw reciprocating extruder, or a ring extruder.

24. The method of claim 23, wherein the extruder has a specific throughput rate of about 0.5 kg/cm$^3$ to about 8 kg/cm$^3$.

25. The method of claim 23, wherein the extruder further comprises a melt pump.

26. The method of claim 23, wherein the melt has a residence time in the extruder of less than or equal to about 1 minute.

27. The method of claim 18, further comprising compounding the poly(arylene ether) and poly(alkenyl aromatic) prior to melt blending.

28. The method of claim 27, wherein the compounding is performed in a counterrotating conical extruder, or a counterrotating extruder.

29. The method of claim 1, wherein the mixture is formed by combining poly(arylene ether), poly(alkenyl aromatic), and a solvent to form a solution mixture.

30. The method of claim 1, wherein the mixture is formed by combining poly(arylene ether) powder and poly(alkenyl aromatic) powder to form a powder mixture.

31. The method of claim 1, wherein the combining is performed in an environment substantially free of particulate impurities.

32. The method of claim 1, wherein the combining is performed under an inert atmosphere.

33. The method of claim 1, wherein the mixture is filtered using a third filtration system to remove particulate impurities.

34. The method of claim 33, wherein the third filtration system comprises a filter having a pore size of about 0.01 to about 50 micrometers.

35. The method of claim 33, wherein the third filtration system comprises a sintered metal filter, a cloth filter, a fiber filter, a paper filter, a pulp filter, a metal mesh filter, a ceramic filter, or a combination comprising at least one of the foregoing filters.

36. The method of claim 33, wherein the third filtration system comprises a filter having a geometry that is cone, pleated, candle, stack, flat, wraparound, or a combination comprising at least one of the foregoing geometries.

37. The method of claim 1, wherein the mixture is a solution, melt, or powder.

38. The method of claim 1, wherein the polymeric material is obtained from the mixture by precipitation, or by the removal of solvent using a devolatilization extruder, a flash vessel, a distillation system, or a combination comprising at least one of the foregoing.

39. The method of claim 1, wherein the mixture further comprises a solvent, superheating the mixture; filtering the superheated mixture to form a superheated filtrate; feeding the superheated filtrate to an extruder, wherein the extruder comprises an upstream vent and a downstream vent; removing solvent from the filtrate via the upstream vent and the downstream vent; and obtaining a polymeric material.

40. The method of claim 39, wherein to polymeric material is obtained in the form of a pellet.

41. The method of claim 1, wherein an organic phase of the reaction mixture comprising the poly(arylene ether) in fed into a devolatilization extruder and the poly(alkylene aromatic) is fed to the extruder via a side feeder to form the mixture.

42. The method of claim 1, wherein the polymeric material is obtained in an environment substantially free of particulate impurities.

43. The method of claim 42, further comprising packaging, storing, or packaging and storing the polymeric material in an environment substantially free of particulate impurities.

44. The method of claim 1, wherein the obtaining is performed under an inert atomosphere.

45. The method of claim 1, wherein the poly(arylene ether) comprises a plurality of structural units of the structure

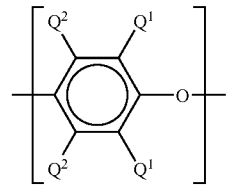

wherein for each $Q^1$ is independently halogen, primary or secondary $C_1$–$C_7$ alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms.

46. The method of claim 45, wherein the poly(arylene ether) has an intrinsic viscosity of about 0.10 to about 0.60 deciliters per gram as measured in chloroform at 25° C.

47. The method of claim 1, wherein the poly(arylene ether) is salicylate capped poly(arylene ether).

48. The method of claim 1, wherein the poly(alkenyl aromatic) contains at least 25% by weight of structural units derived from an alkenyl aromatic monomer of the formula

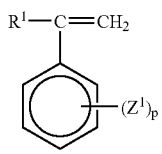

wherein $R^1$ is hydrogen, $C_1$–$C_8$ alkyl, or halogen; $Z^1$ is vinyl, halogen or $C_1$–$C_8$ alkyl; and p is 0 to 5.

49. The method of 1, wherein the poly(alkenyl aromatic) is atactic crystal polystyrene.

50. The method of claim 1, wherein the polymeric material comprises about 90 to about 10 percent by weight of the poly(arylene ether) and about 10 to about 90 percent by weight of the poly(alkenyl aromatic).

51. The method of claim 1, wherein the polymeric material comprises about 60w about 30 percent by weight of the poly(arylene ether) and about 40 to about 70 percent by weight of the poly(alkenyl aromatic).

52. The method of claim 1, wherein the polymeric material further comprises flame retardants, mold release agents, lubricants, antioxidants, thermal stabilizers, ultraviolet stabilizers, pigments, dyes, colorants, anti-static agents, conductive agents, or a combination comprising at least one of the foregoing additives.

53. The method of claim 1, wherein the solvent is a halogenated aromatic solvent, a halogenated aliphatic solvent, a non-halogenated aromatic solvent, a non-halogenated aliphatic solvent, or a combination comprising at least one of the foregoing solvents.

54. The method of claim 1, wherein the solvent is ortho-dichlorobenzene or toluene.

55. The method of claim 1, wherein the polymeric material is obtained in the form of a pellet powder, or flake.

56. An article comprising the polymeric material prepared by the method of claim 1, wherein the article is formed by injection molding, direct injection molding, blow molding, extrusion, sheet extrusion, film extrusion, profile extrusion, pultrusion, compression molding, thermoforming, pressure forming, hydroforming, or vacuum forming.

57. A data storage medium comprising the polymeric material prepared by the method of claim 1.

58. A method of preparing a polymeric material, comprising:
    combining poly(arylene ether) and poly(alkenyl aromatic) to form a mixture, wherein the poly(arylene ether) prior to combining, the poly(alkenyl aromatic) prior to combining, the mixture, or a combination of the foregoing is purified;
    wherein the poly(arylene ether), poly(alkenyl aromatic), and the mixture are independently in the form of a solution, melt, or solid, and when in the form of a solution, the solution is filtered through a filtration system to remove particulate impurities; and
    wherein the filtration system comprises a filter having a geometry that is cone, pleated, candle, stack, flat, wraparound, or a combination comprising at least one of the foregoing geometries;
    obtaining a polymeric material from the mixture wherein the polymeric material comprises poly(arylene ether) and poly(alkenyl aromatic), wherein the polymeric material is optionally purified;
    packaging, storing, or packaging and storing the polymeric material, wherein the polymeric material is substantially free of visible particulate impurities; and
    wherein the combining, the obtaining, the purifying, or a combination of the foregoing steps is performed under an inert atmosphere.

59. The method of claim 58, wherein the combining, the obtaining, the packaging, or a combination of the foregoing steps is performed in an environment substantially free of particulate impurities.

60. The method of claim 58, wherein the filtration system comprises a filter having a pare size of about 0.01 to about 50 micrometers.

61. The method of claim 58, wherein the filtration system comprises a sintered metal filter, a cloth filter, a fiber filter, a paper filter, a pulp filter, a metal mesh filter, a ceramic filter, or a combination of the foregoing filters.

62. The method of claim 58, wherein the poly(arylene ether), poly(alkenyl aromatic), and the mixture are independently in the form of a melt, and wherein the melt is filtered through a melt filtration system.

63. The method of claim 62, wherein the melt filtration system comprises a sintered metal filter, a metal mesh filter, a fiber metal felt filter, a ceramic filter, or a combination comprising at least one of the foregoing filters.

64. The method of claim 62, wherein the melt filtration system comprises a filter having a geometry that is cone, pleated, candle, stack, flat, wraparound, or a combination comprising at least one of the foregoing geometries.

65. The method of claim 62, wherein the melt filtration system comprises a filter having a pore size of about 0.5 to about 200 micrometers.

66. A method of preparing a polymeric material, comprising:
    combining poly(arylene ether) and poly(alkenyl aromatic) to form a mixture, wherein, prior to combining, the poly(arylene ether), the poly(alkenyl aromatic), or both are purified and/or the mixture is purified subsequent to combining
    wherein the mixture is formed by melt blending the poly(arylene ether) and poly(alkenyl aromatic) to form a melt;
    wherein the melt blending occurs in a twin screw counter-rotating extruder, a twin screw co-rotating extruder, a single screw extruder, a single screw reciprocating extruder, or a ring extruder;
    wherein the extruder further comprises a melt pump;
    obtaining a polymeric material from the mixture wherein the polymeric material comprises poly(arylene ether) and poly(alkenyl aromatic), wherein the polymeric material is optionally purified;
    packaging, storing, or packaging and storing the polymeric material, wherein the polymeric material is substantially free of visible particulate impurities.

67. The method of claim 66, wherein the extruder has a specific throughput rate of about 0.5 kg/cm³ to about 8 kg/cm³.

68. The method of claim 67, wherein the melt has a residence time in the extruder of less than or equal to 1 minute.

69. The method of claim 67, further comprising compounding the poly(arylene ether) and poly(alkenyl aromatic) prior to melt blending.

70. The method of claim 69, wherein the compounding is performed in a counterrotating conical extruder, or a counterrotating extruder.

71. The method of claim 58, wherein the mixture is formed by combining poly(arylene ether) and poly(alkenyl aromatic) to form a solution mixture comprising poly(arylene ether), poly(alkenyl aromatic), and solvent.

72. The method of claim 58, wherein the mixture is formed by combining poly(arylene ether) powder and poly(alkenyl aromatic) powder to form a powder mixture.

73. The method of claim 58, wherein the combining is performed in an environment substantially free of particulate impurities.

74. The method of claim 58, wherein the combining is performed under an inert atmosphere.

75. The method of claim 58, wherein the polymeric material is obtained from the mixture by precipitation or by the removal of solvent using a devolatilization extruder, a flash vessel, a distillation system, or a combination comprising at least one of the foregoing.

76. The method of claim 71, further comprising superheating the solution mixture; filtering the superheated mixture to form a superheated filtrate; feeding the superheated filtrate to an extruder, wherein the extruder comprises an upstream vent and a downstream vent; removing solvent from the filtrate via the upstream vent and the downstream vent; and obtaining a polymeric material.

77. The method of claim 71, further comprising filtering the solution mixture to form a filtrate; superheating the filtrate; feeding the superheated filtrate to an extruder, wherein the extruder comprises an upstream vent and a downstream vent; removing solvent from the filtrate via the upstream vent and the downstream vent; and obtaining a polymeric material.

78. The method of claim 58, wherein the poly(arylene ether) is in the form of a solution fed to a devolatilization extruder mad the poly(alkenyl aromatic) is added to the devolatilization extruder via a non-vented side feeder to form the mixture.

79. The method of claim 58, wherein the polymeric material is obtained in the form of a pellet.

80. The method of claim 58, wherein the polymeric material is obtained in an environment substantially free of particulate impurities.

81. The method of claim 58, wherein the packaging storing, or packaging and storing is performed in an environment substantially free of particulate impurities.

82. The method of claim 58, wherein the obtaining is performed under an inert atomosphere.

83. The method of claim 58, wherein the poly(arylene ether) comprises a plurality of structural units of the structure

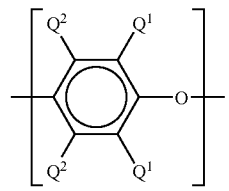

wherein for each structural wilt, each $Q^1$ is independently halogen, primary or secondary $C_1$–$C_7$ alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms.

84. The method of claim 83, wherein the poly(arylene ether) has an intrinsic viscosity of about 0.10 to about 0.60 deciliters per gram as measured in chloroform at 25° C.

85. The method of claim 58, wherein the poly(arylene ether) is salicylate capped poly(arylene ether).

86. The method of claim 58, wherein the poly(alkenyl aromatic) contains at least 25% by weight of structural units derived from an alkenyl aromatic monomer of the formula

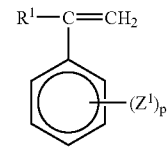

wherein $R^1$ is hydrogen $C_1$–$C_8$ alkyl, or halogen; $Z^1$ is vinyl, halogen or $C_1$–$C_8$ alkyl; and p is 0 to 5.

87. The method of 58, wherein the poly(alkenyl aromatic) is atactic crystal polystyrene.

88. The method of claim 58, wherein the polymeric material comprises about 90 to about 10 percent by weight of the poly(arylene ether) and about 10 to about 90 percent by weight of the poly(alkenyl aromatic).

89. The method of claim 58, wherein the polymeric material comprises about 60 to about 30 percent by weight of the poly(arylene ether) and about 40 to about 70 percent by weight of the poly(alkenyl aromatic).

90. The method of claim 58, wherein the polymeric material further comprises flame retardants, mold release agents, lubricants, antioxidants, thermal stabilizers, ultraviolet stabilizers, pigments, dyes, colorants, anti-static agents, conductive agents, or a combination comprising at least one of the foregoing additives.

91. The method of claim 71, wherein the solvent is a halogenated aromatic solvent, a halogenated aliphatic solvent, a non-halogenated aromatic solvent, a non-halogenated aliphatic solvent, or a combination comprising at least one of the foregoing solvents.

92. The method of claim 71, wherein the solvent is ortho-dichlorobenzene or toluene.

93. The method of claim 58, wherein the polymeric material is obtained in the form of a pellet, powder, or flake.

94. An article comprising the polymeric material prepared by the method of claim 58, wherein the article is formed by injection molding, direct injection molding, blow molding, extrusion, sheet extrusion, film extrusion, profile extrusion, pultrusion, compression molding, thermoforming, pressure forming, hydroforming, or vacuum forming.

95. A data storage medium comprising the polymeric material prepared by the method of claim 58.

96. A method of preparing a polymeric material, comprising:
- reacting a monohydroxy aromatic compound in the presence of a catalyst, oxygen, and a solvent to form a reaction mixture comprising a poly(arylene ether), wherein the monohydroxy aromatic compound prior to reacting, the solvent prior to reacting, the reaction mixture, or a combination of the foregoing optionally purified;
- isolating and purifying the poly(arylene ether);
- combining the poly(arylene ether) with a poly(alkenyl aromatic) to form a mixture, wherein the poly(alkenyl aromatic) is purified prior to combining and/or the mixture is purified subsequent to combining;
- obtaining a polymeric material from the mixture, wherein the polymeric material is substantially free of visible particulate impurities and comprises poly(arylene ether) and poly(alkenyl aromatic), wherein the polymeric material is optionally purified;
- packaging or storing the polymeric material, wherein the packaging storing, or packaging and storing of the polymeric material is performed in an environment substantially free of particulate impurities.

97. A method of preparing a polymeric material, comprising:
- reacting a monohydroxy aromatic compound in the presence of a catalyst, oxygen, and a solvent to form a reaction mixture comprising a poly(phenylene ether);
- precipitating the poly(arylene ether) from the reaction mixture to obtain poly(phenylene ether) powder;
- mixing the poly(phenylene ether) powder and polystyrene in a solvent to form a mixture, wherein the amount of poly(phenylene ether) powder and polystyrene in the solvent is less then or equal to about 75 weight percent based on the total weight of poly(phenylene ether) powder, polystyrene, and solvent;
- superheating the mixture and filtering the superheated mixture through a filtration system comprising sintered metal filters to form a filtrate;
- concentrating the filtrate by removal of solvent from the filtrate to form a concentrated filtrate;
- introducing the concentrated filtrate to an extruder, wherein the extruder comprises en upstream vent and a downstream vent;
- removing solvent from the concentrated filtrate via the upstream vent and the downstream vent; and
- isolating a polymeric material from the concentrated filtrate;
- wherein the polymeric material comprises poly(phenylene ether) and polystyrene.

98. The method of claim 97, wherein the extruder operation is characterized by a ratio of a feed rate in kilograms per hour to an extruder screw speed in revolutions per minute, the ratio being about 0.045 to about 45.

99. The method of claim 97, wherein the concentrated filtrate is pressurized and introduced to the extruder via a pressure control valve.

100. The method of claim 97, wherein the extruder further comprises a side feeder, wherein the side feeder comprises a side feeder vent operated at about 750 mm of Hg or greater or at about 750 of Hg or less; and wherein the upstream vent is operated at about 750 mm of Hg or greater or about 750 mm of Hg or less, and wherein the downstream vent is operated at about 750 mm of Hg or less.

101. The method of claim 100, wherein the concentrated filtrate is introduced to the extruder via a pressure control valve located on the side feeder.

* * * * *